United States Patent [19]

Keith et al.

[11] Patent Number: 4,480,979
[45] Date of Patent: Nov. 6, 1984

[54] STRETCH FORMING HOLLOW ARTICLES

[75] Inventors: Donald G. Keith, Mount Eliza; Anthony E. Flecknoe-Brown, Carlton, both of Australia

[73] Assignee: A.A.R.C. (Management) Pty. Limited, Victoria, Australia

[21] Appl. No.: 298,917

[22] Filed: Sep. 2, 1981

Related U.S. Application Data

[63] Continuation-in-part of Ser. No. 40,312, May 18, 1978, Pat. No. 4,288,401.

[30] Foreign Application Priority Data

| May 18, 1978 | [AU] | Australia | PD4433 |
| Jun. 22, 1978 | [AU] | Australia | PD4833 |
| Apr. 3, 1979 | [AU] | Australia | PD8263 |
| Apr. 17, 1979 | [AU] | Australia | PD8393 |
| Feb. 23, 1981 | [AU] | Australia | PE7705 |
| Feb. 23, 1981 | [AU] | Australia | PE7706 |
| Feb. 23, 1981 | [AU] | Australia | PE7707 |
| Feb. 23, 1981 | [AU] | Australia | PE7708 |

[51] Int. Cl.³ ............................................. B29C 17/03
[52] U.S. Cl. .................................. 425/403; 264/550; 264/551; 264/292; 425/387.1; 425/388; 425/398; 425/400
[58] Field of Search .................... 425/387.1, 388, 398, 425/400, 403; 264/522, 549, 550, 551, 292

[56] References Cited

U.S. PATENT DOCUMENTS 2,985,915 5/1961 Winstead ........................... 264/292
3,975,493 8/1967 Tigner et al. ...................... 264/292

FOREIGN PATENT DOCUMENTS

| 220445 | 7/1958 | Australia . |
| 243253 | 5/1960 | Australia . |
| 460849 | 5/1974 | Australia . |
| 1214895 | 4/1960 | France . |
| 1238800 | 7/1960 | France . |
| 860810 | 2/1961 | United Kingdom . |

Primary Examiner—Jan H. Silbaugh
Attorney, Agent, or Firm—Cushman, Darby & Cushman

[57] ABSTRACT

Apparatus for stretch-forming a heat softened sheet of thermoplastics material. The apparatus includes a stretching tool and means to move the stretching tool relative to means holding the sheet so as to stretch the sheet in a preselected direction with the tool. The stretching tool includes a plurality of blades having edges for pressing against the sheet to stretch the sheet and a cam to move the blades transversely away from each other to stretch the sheet transversely of the preselected direction as the tool is moved to stretch the sheet in the preselected directions.

1 Claim, 64 Drawing Figures

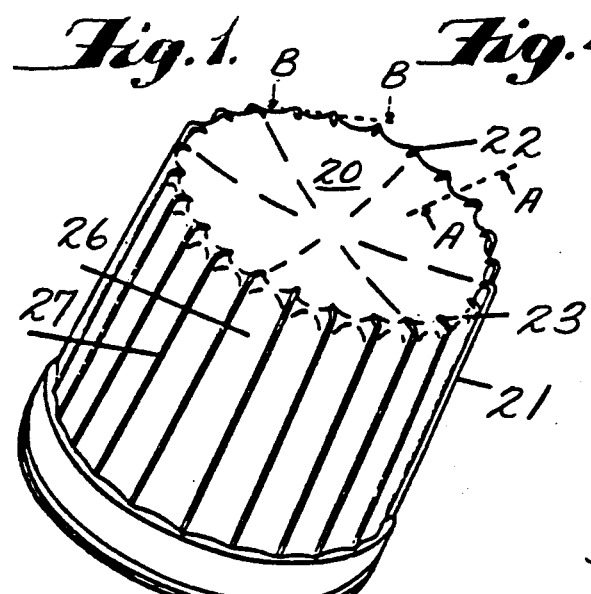
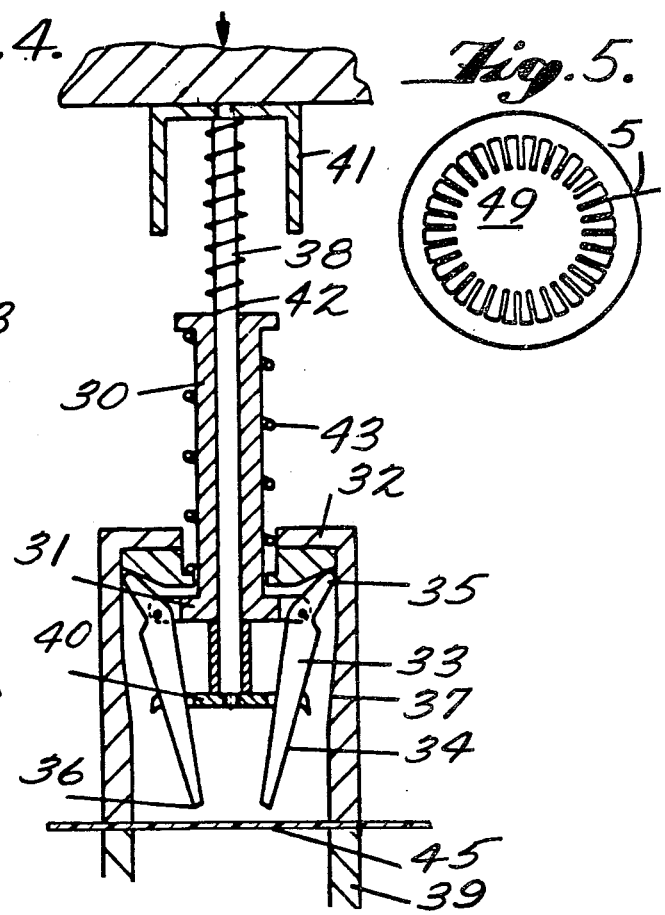
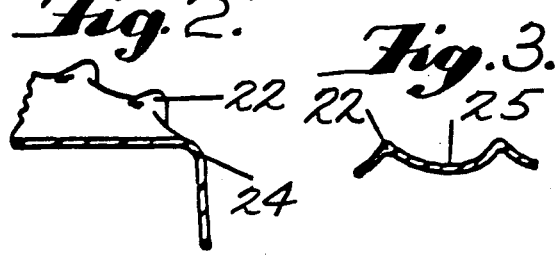
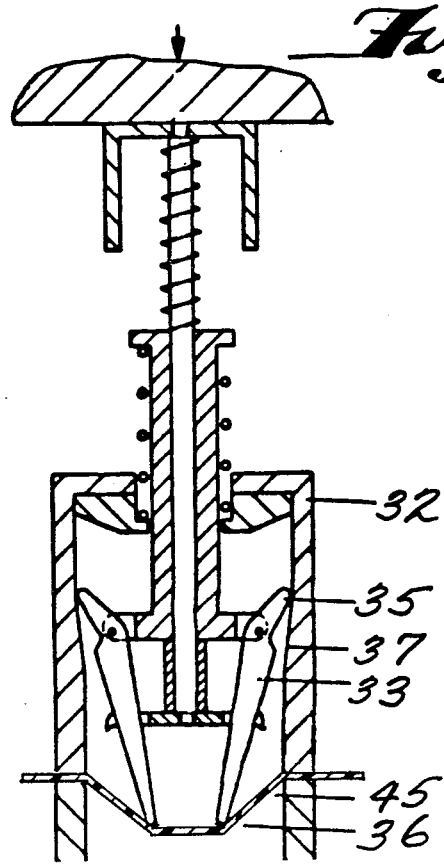
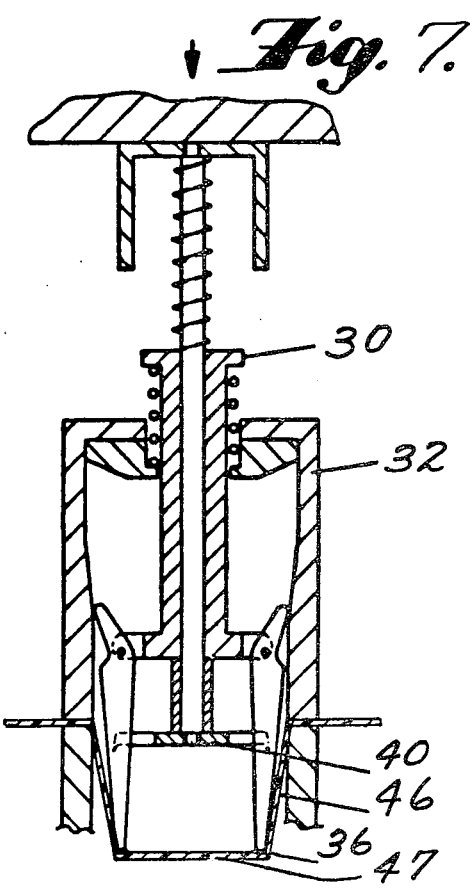

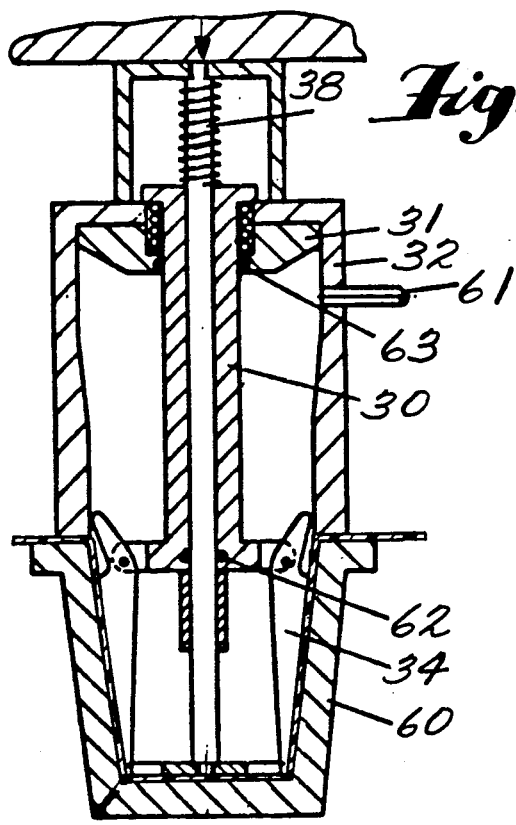
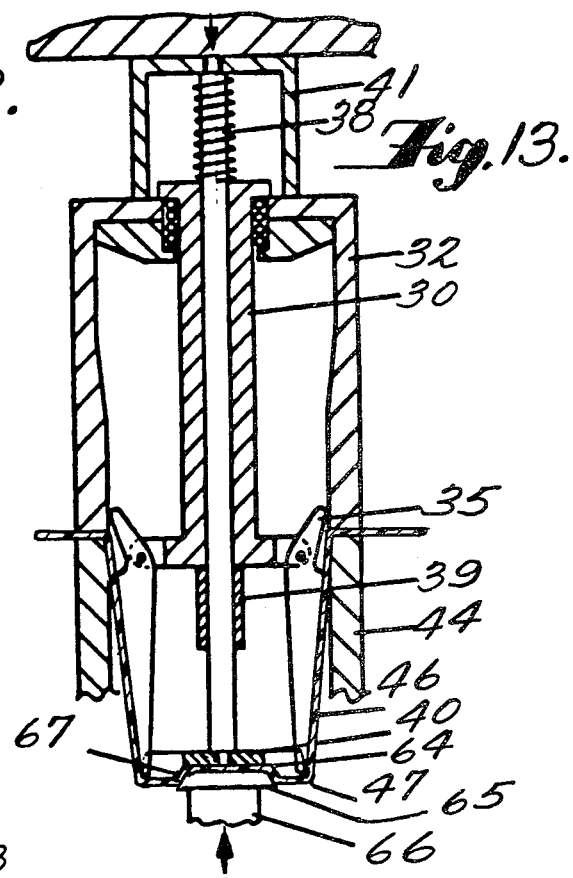
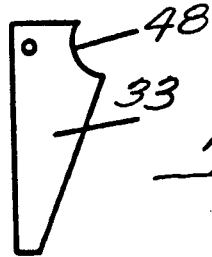
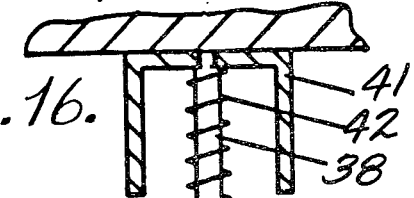
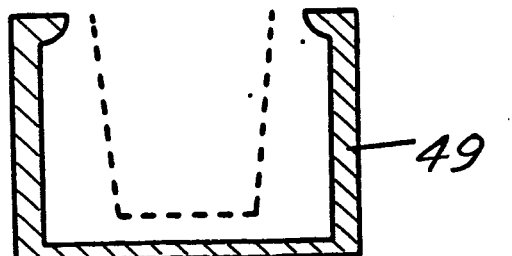
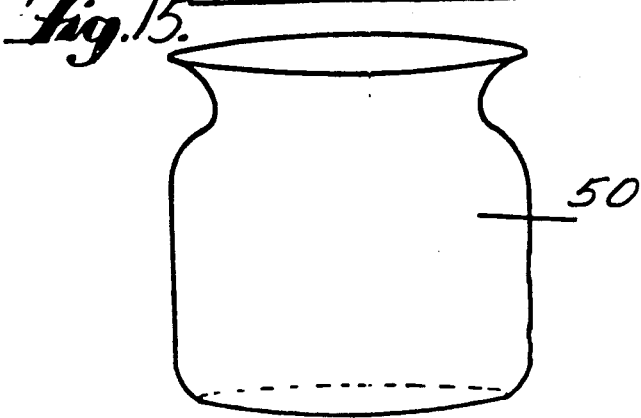
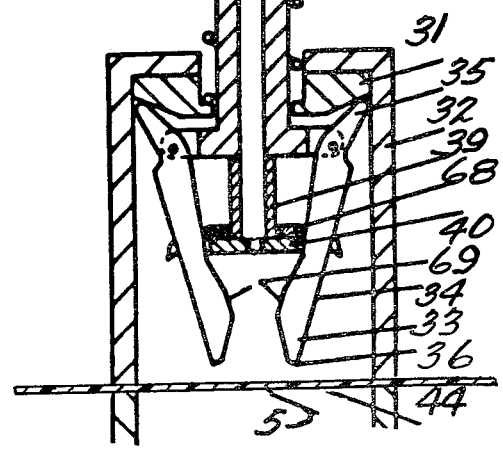

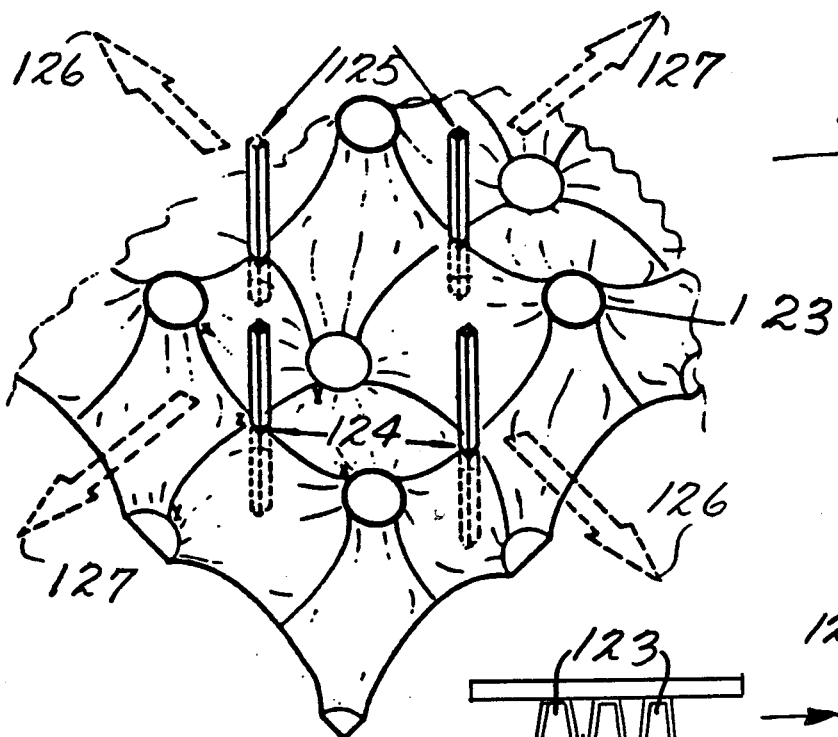
Fig. 25.
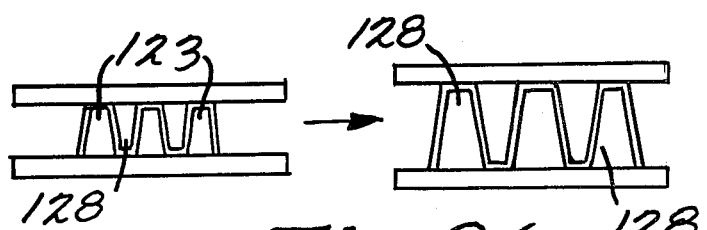
Fig. 26.
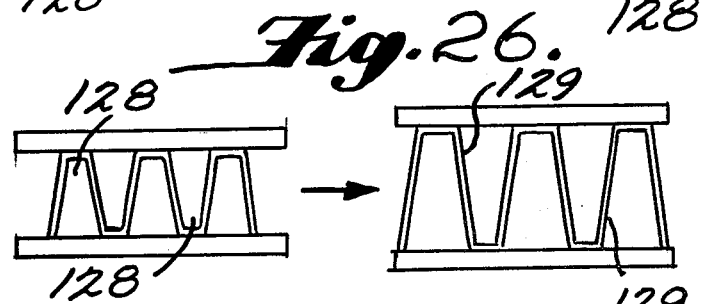
Fig. 27.
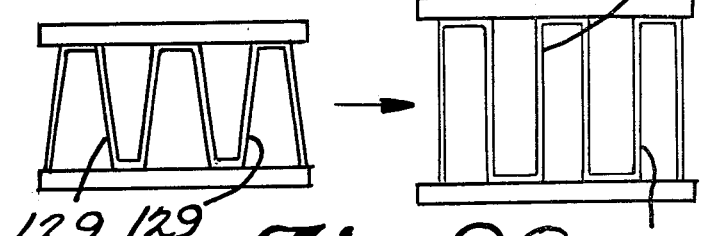
Fig. 28.
Fig. 29.
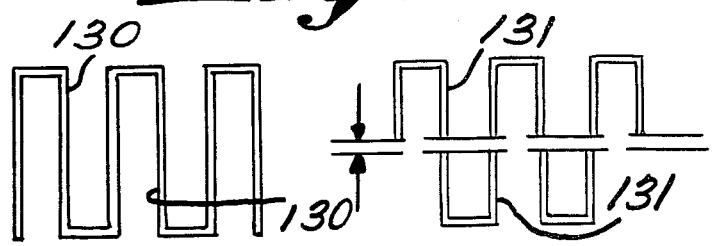

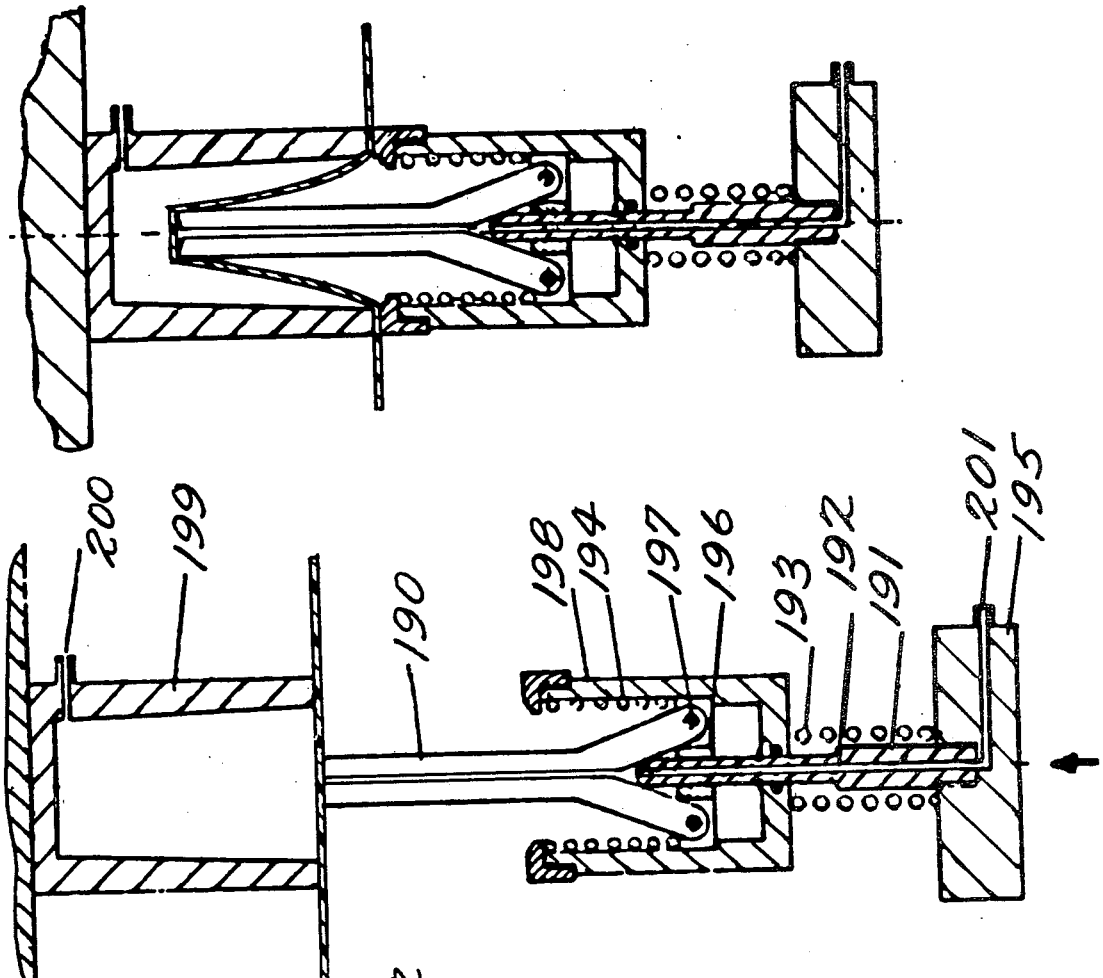
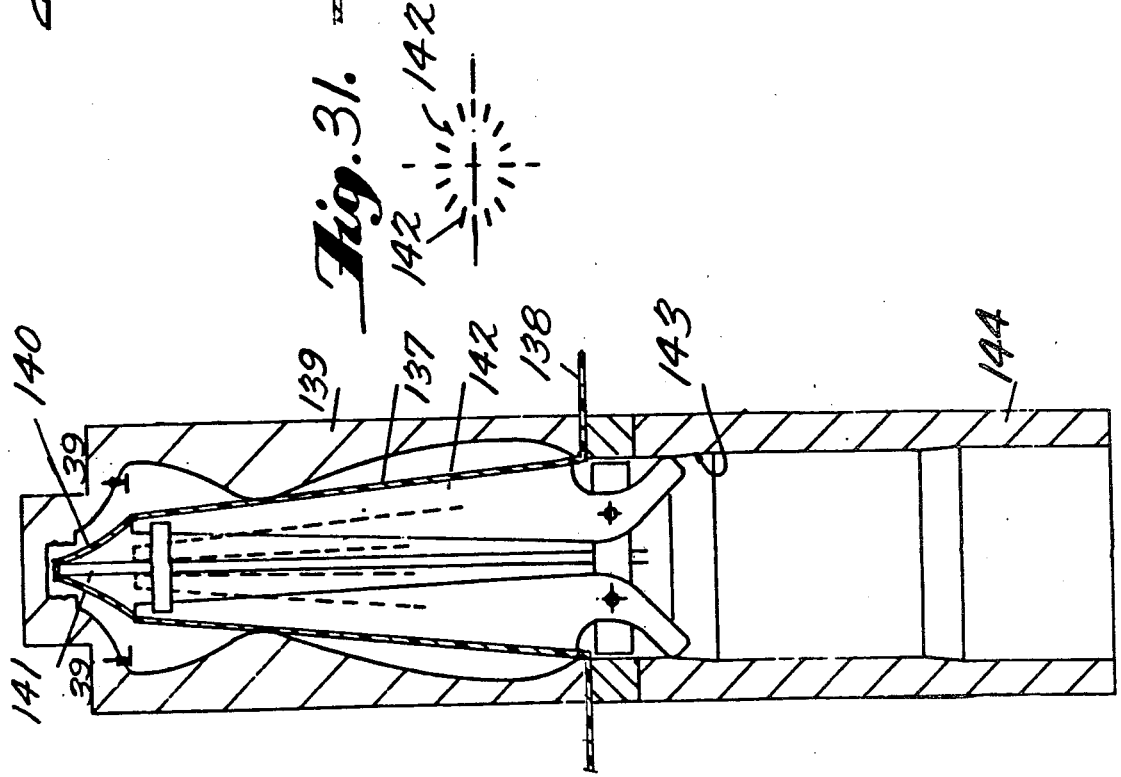

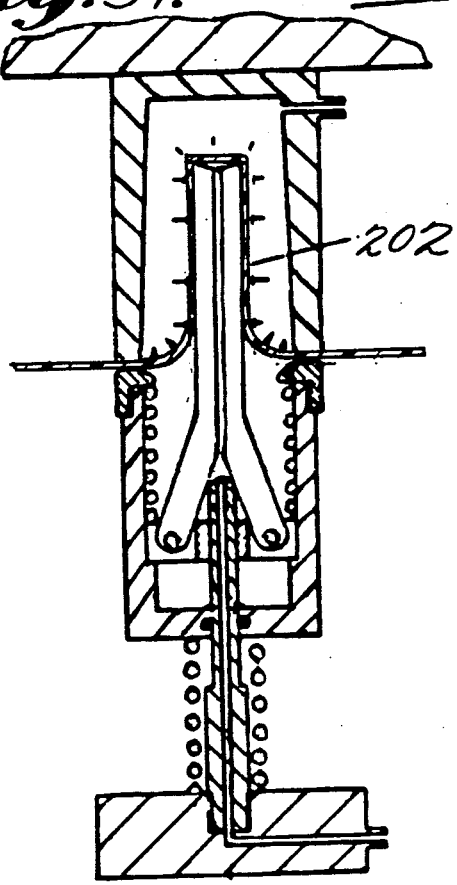
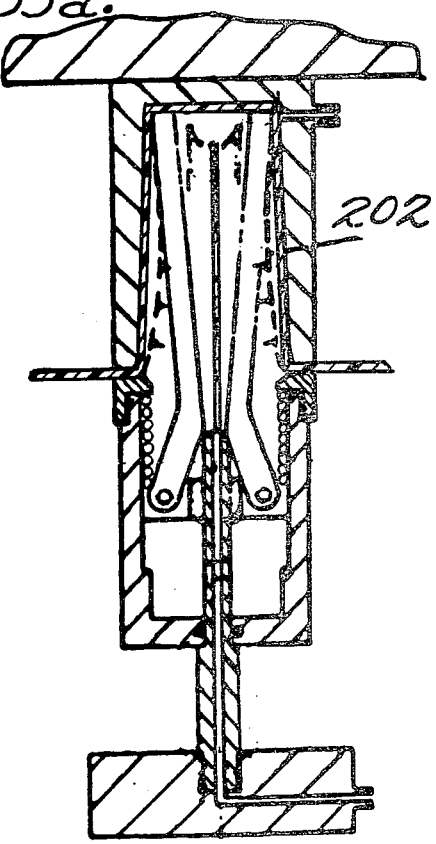
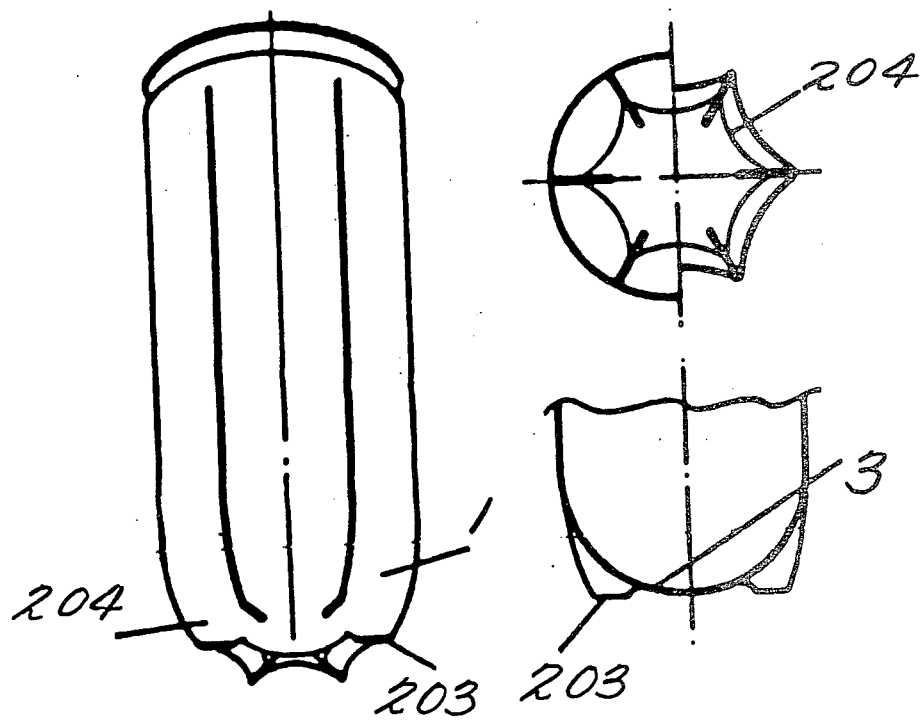

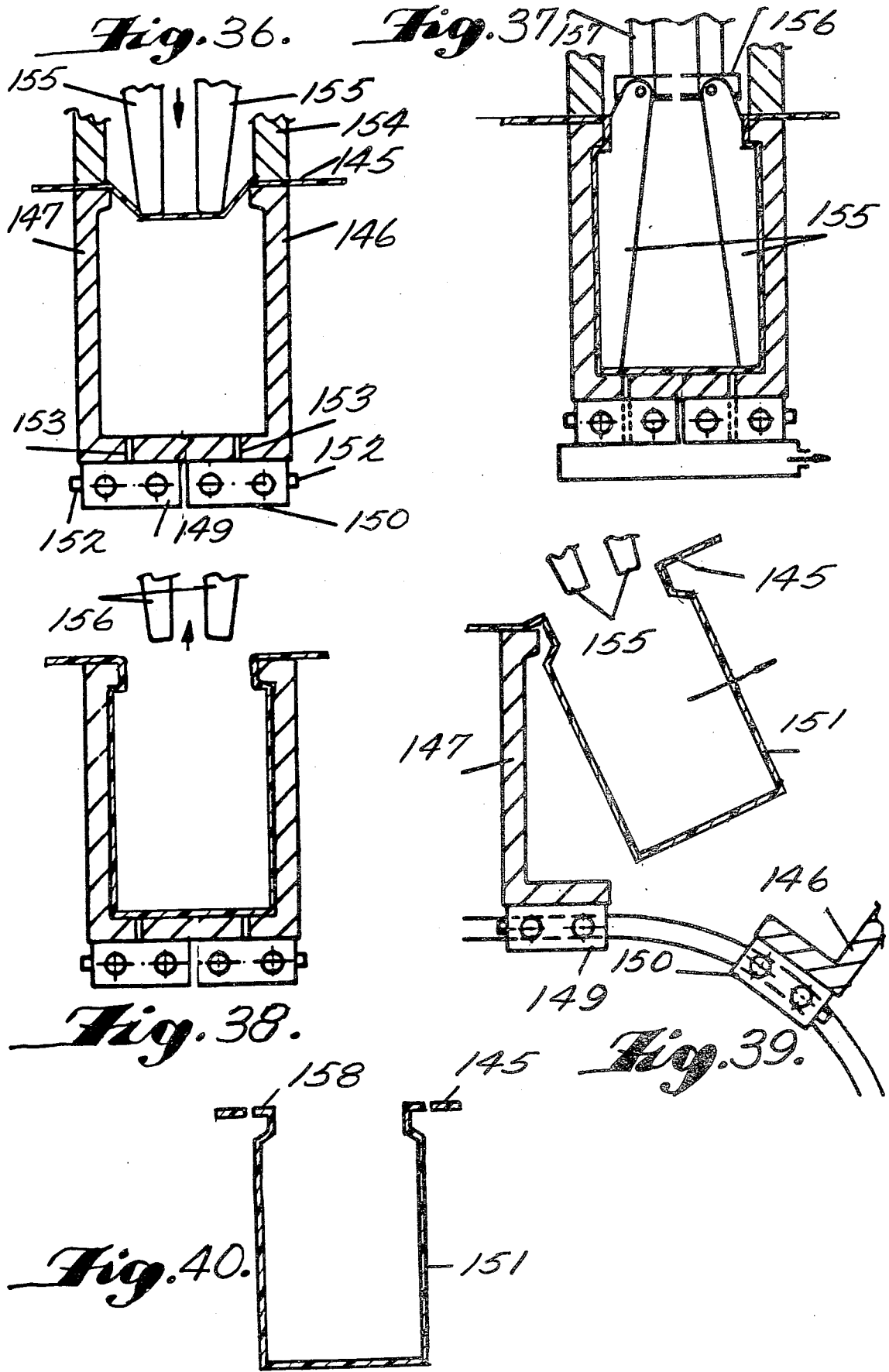

TENSILE STRENGTH ORIENTATION

ACTUAL BURST STRENGTH

STRETCH FORMING HOLLOW ARTICLES

This application is a continuation-in-part of our co-pending application Ser. No. 40,312, filed May 18, 1978, now U.S. Pat. No. 4,288,401.

This invention relates to a method and apparatus for stretch-forming hollow articles (e.g. cups) from a heat-softened sheet of thermoplastics material and to stretch-formed plastics hollow articles.

Australian patent specification No. 460 849 (the contents of which are herein incorporated by reference) explains that certain plastics materials which can be melt-spun into fibres do not stretch-form easily in conventional stretch-forming processes such as drape moulding or vacuum forming because during stretch-forming they thin excessively and often puncture. To overcome this problem, AU No. 460 849 discloses a method of stretch-forming a heat-softened sheet of melt-spinnable plastics material held against substantial non-stretching movements in which the sheet is stretched initially by a movement of a cold tip of a needle or knife edge relative to the sheet which causes the tip to press against one face of the sheet and stretch or "cuspate" part of the sheet into a cuspidate parison which it is postulated can then be dilated by blowing it into a cavity mould by pneumatic pressure. The cold tip chills and therefore strengthens the localised blob of heat-softened plastics material at the cusp against which the tip presses and so the chilled blob prevents puncture of the sheet by the tip and enables unchilled portions of the sheet to stretch in response to pressure exerted on the blob by the tip.

British patent specification No. 1 378 945 (the contents of which are herein incorporated by reference) discloses an alternative method of stretch-forming a heat-softened sheet of a polyolefin. (Most polyolefins are melt-spinnable plastics materials). The sheet is held against substantial non-stretching movement and is stretched initially by a movement of a stretching tool relative to the sheet which causes the leading end of the tool to press against one face of the sheet and to stretch part of the sheet into a parison which is then dilated by blowing into a cavity mould by pneumatic pressure to form a cup. GB No. 1 378 945 explains that during stretching, excessive thinning of the sheet is caused by frictional forces and premature cooling occurring in regions of the sheet which contact the stretching tool and GB No. 1 378 945 seeks to minimise this problem by use of a special stretching tool. The special stretching tool comprises a leading end and a body formed with integral longitudinally extending recesses. Therefore the only portions of the tool to contact the sheet during stretching are its leading end and its lobial tips. This leaves large portions of the sheet free from contact with the tool and free to stretch unhindered by frictional forces and premature cooling. However, the tips are integral with the body of the tool and cannot be separated from one another and so after an initial stretching by the tool, GB No. 1 378 945 must rely on a blowing process for dilation and hence a cavity mould and means for supplying pneumatic pressure are needed. Also, despite the use of lobial tips, large areas of the sheet still contact the stretching tool.

Australian patent specification No. 220 445 discloses a method and apparatus for producing a hollow open-topped container by pressing an expansible plunger against a confined molten sheet of polyethylene, to the desired depth of draw, then expanding the plunger laterally, allowing the polythene to set, and finally collapsing and retracting the plunger. As an additional step, the polythene may be blown pneumatically against the wall of a female mould while still hot after shaping by the plunger. It is found that this method does not produce containers of sufficiently uniform wall thickness to enable any saving of material to be realised.

It has now been discovered that when the sheet is stretched initially by a primary movement of a cold stretching tool followed by simultaneous stretching and dilation, greater uniformity of wall thickness is achieved.

Accordingly this invention provides a method of stretch-forming a hollow article (e.g. a cup) from a sheet of thermoplastic material at a temperature higher than 75 degrees celsius below the melting point and held against substantial non-stretching movement wherein the sheet is stretched initially by primary movement relative to the sheet of a stretching tool which movement presses the tool against one face of the sheet; characterised in that the tool comprises tips which press against the sheet during stretching and which are at a temperature lower than 20 degrees celsius below the temperature of the sheet and in tha the initially stretched sheet is simultaneously, with the continued primary movement of the stretching tool, dilated in a direction transverse to the direction of the primary movement of the stretching tool. The stretching of the sheet into a cuspidate parison by an initial movement of a stretching tool is called "cuspation" by Au No. 460 849.

Accordingly the invention also provides apparatus for stretch-forming a heat-softened sheet of thermoplastic material, the apparatus comprising means to hold the sheet against substantial non-stretching movement, a stretching tool, and means to cause a primary movement of the stretching tool relative to the sheet so as to cause the tool to press against the sheet and to stretch the sheet characterised in that the stretching tool comprises tips for pressing against the sheet to cause it to stretch and means to dilate the sheet simultaneously with the continued primary movement of the stretching tool in a direction transverse to the direction of the primary movement of the tool.

In one embodiment, the stretching tool comprises an array of at least six neighbouring separable tips which simultaneously engage the sheet. As the tool touches the sheet, at each point of contact it chills a blob of the hot plastics material so strengthening the blob and enabling it to resist puncture by the tool even if the tool is needle sharp.

The strengthened chilled blobs also enable the sheet to stretch in response to pressure exerted on the blobs by the tool.

The use of a sharp tool produces very small blobs (e.g. 0.5 to 2 mm wide) leaving nearly all the stretchable sheet free to stretch out of contact with the stretching tool and this promotes a more controlled thinning of the sheet. The chilled blobs themselves suffer less stretching and therefore less thinning than other portions of the sheet so that the perimeter of the base of the hollow article is marked by blobs of less stretched plastics material. Accordingly this invention also provides a stretch-formed hollow plastics container comprising a base and side wall characterised in that the perimeter of the base is marked by blobs of less stretched plastics material.

Usually the blobs are virtually unstretched and unthinned.

In order to ensure adequate strengthening of the blobs, it is necessary to ensure that an adequate temperature differential exists between the tool and the heat-softened sheet. In the case of most commonly available plastics materials this can be achieved by using cold (e.g. room temperature) tips. The size of the minimum temperature differential will depend on the nature of the plastics material, the thickness of the sheet, the shape and size of the tips, the specific heat and thermal conductivity of the material from which the tips are made and the speed at which the sheet is stretched by the primary movement of the stretching tool. Useful temperatures for various plastics materials are given by AU No. 460 849.

Examples of suitable thermoplastic material are:
(a) high impact polystyrenes;
(b) aliphatic (preferably crystalline) polyolefins including poly-4-methyl pentene-1, polybutenes, low, medium, and high density polyethylenes or copolymers of ethylene with vinyl alcohol, vinyl acetate, acrylic or methacrylic acids or their methyl, propyl, ethyl or butyl esters or homopolymers of propylene or copolymers of propylene with up to 30% (by weight of the copolymer) of ethylene and preferably the ethylene and propylene polymers should have a melt flow index of between 0.1 to 8 g/10 minutes as measured according to British Standard 2782 Part 1/105C of 1970 except that in the case of polymers containing a major amount by weight of propylene, a temperature of 230 C is used instead of 190 C;
(c) thermoplastic rubbers including ethylene propylene rubbers such as those described in an article by L. M. Glanville in "Chemistry and Industry" 16 Mar. 1974 pages 255 to 257 (the contents of which are herein incorporated by reference) especially when diene modified, using dienes such as 1,4-hexadiene, dicyclopentadiene or methylene or ethylidiene norbornenes and in particular blends of such rubbers with polypropylenes;
(d) polyesters such as the condensates of ethylene glycol or tetramethylene glycol or 1,1-(dihydroxymethyl) cyclohexane with terephthalic acid or mixtures of terephthalic acid and isphthalic acid;
(e) polyamides including nylons 66, 610, 6 and 11
(f) copolymers of vinylidene chloride;
(g) inorganic glasses including soda or borosilicate glass; and
(h) supercooled liquid sugar solution such as toffee;
(i) superplastic metals.

During initial stretching of the sheet by a multiple tip tool, saddles of heat-softened material form between neighbouring tips. The material inboard of these saddles is virtually unextended during initial stretching whereas material outboard of the saddles (which forms the side walls of the hollow article) stretches in proportion to the extent of the initial movement of the stretching tool. Separation of the tips stretches material inboard of the saddles to dilate the initially stretched sheet and form the base of the hollow article.

A more positive control on the shape of the article (especially the side walls) can often be achieved by using tips each of which is located to one end of an edge and during dilation the edges are brought into contact with the sheet. In this way the edges can be used to define for example a slanting or vertical side wall comprising three or more contiguous longitudinal flat or slightly concave panels wherein the boundary between each pair of contiguous panels extends from a blob of less stretched material located on the perimeter of the base of the hollow article. The boundary is often a slight ridge and if unpigmented plastics material is used it can show improved translucency. Provided the edges comprise sharp knife edges, the increase in area of contact between the sheet and stretching tool has little effect on the freedom of the sheet to stretch.

Separation of the knife edges also stretches the material of the side walls transversely to the stretch imparted by the initial stretching of the sheet. Accordingly when the sheet comprises a crystalline plastics material at a temperature below (preferably 15 degrees celsius or more below) its crystalline melting point, the initial stretching imparts a longitudinal orientation to the material of the side wall and the separation of the tips and edges imparts a transverse orientation to the material of the base and side wall with the result that the side wall becomes biaxially orientated and hence its hoop strength is improved.

In contrast to earlier proposals, with the present invention the temperature of the sheet is not critical, provided it is hotter than a temperature 75 degrees celsius below the melting point of the thermoplastic. The upper limit is determined only by decomposition or combustion of the thermoplastic.

Practical examples of the method and apparatus according to the present invention will now be described with reference to the accompanying drawings. In the drawings:

FIG. 1 is a perspective view of a stretch-formed cup;

FIG. 2 is a partial section on a larger scale on the line 2—2 of FIG. 1;

FIG. 3 is a partial section on a larger scale on the line 3—3 of FIG. 1;

FIG. 4 is a sectional elevation of apparatus for making the cup shown in FIG. 1;

FIG. 5 is an underneath plan in the direction of the arrow 5 in FIG. 1;

FIGS. 6 to 9 are views similar to FIG. 4 showing successive stages in the formation of the cup;

FIG. 12 is a sectional view showing a modified form of tooling incorporating a mold;

FIG. 13 is another sectional view of modified tooling employing molding means for recessing a central area of the resultant cup bottom;

FIGS. 14 & 15 are schematic views which show a tool suitable for forming a necked-in jar shaped container;

FIG. 16 is a sectional view of still another modified form of tooling wherein the plunger carrying the blade alignment head is provided with a cam cooperable with cam surfaces on the blades to effect accurate final expansion of the blades;

FIG. 25 is a perspective view similar to FIG. 22 and shows the holding means of FIG. 24;

FIGS. 26–29 are schematic views showing the manner in which cups are progressively formed with the cups projecting to opposite sides of the sheet and in alternating up and down relation wherein the cups have their centers progressively moved apart as the cups increase in diameter and depth;

FIG. 30 is a sectional view showing tooling for forming a container having a screw threaded neck and of oval cross section;

FIG. 31 is a transverse sectional view through the tooling per se taken generally along the line 39—39 of FIG. 30, and shows the elliptical blade layout of the tooling.

FIGS. 32–35 are sectional views of tooling for air assisted forming of containers from sheet with a high degree of uniform circumferential orientation;

FIGS. 36–39 are sectional views of tooling for forming containers having necked-in upper portions and show the manner in which such containers are progressively formed from a sheet;

FIG. 40 is a sectional view showing the final container as it is blanked from the sheet;

Figure 8:
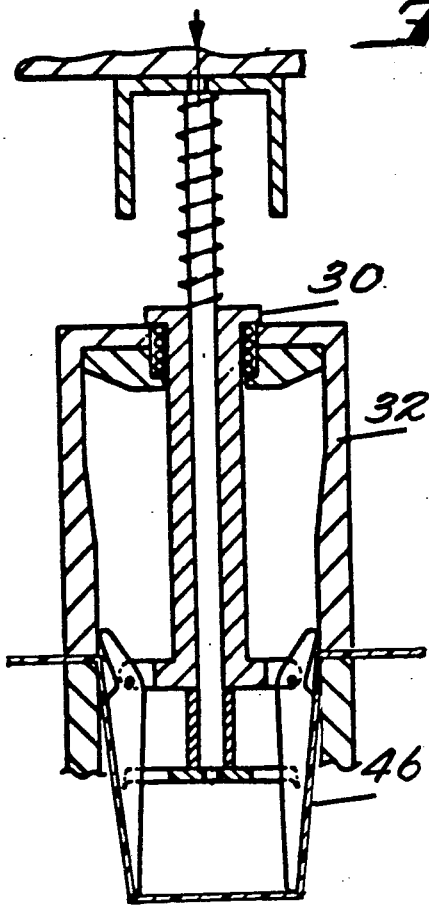

Referring now to the drawings, FIG. 1 shows a cup 105 mm in diameter at the open end and 65 mm deep, which has been stretch-formed from a sheet of crystalline polypropylene 0.6 mm in thickness. The cup is generally frusto-conical in shape, having a substantially circular base 20 and an outwardly sloping side wall 21. Twenty four short thin blobs 22 of virtually unstretched polypropylene are spaced uniformly around the perimeter of the base 20. These blobs 22, which are exaggerated in the drawings for greater clarity, are 1.5 mm wide, extend 5 mm radially inwards from the perimeter, and stand 1 mm proud of the adjacent surface of the base 20. The blobs 22 are spaced apart by doubly radiussed scallops 23 consisting of orthogonally radiussed curves 24 and 25 shown in FIGS. 2 and 3.

Each blob 22 is integral with a band 27 of polypropylene thicker than the adjacent wall portions 26. The bands, like the blobs 22, are composed of virtually unstretched plastic. The wall portions 26 are slightly concave, and merge into the scallops 23.

The apparatus shown in FIG. 4 comprises a primary plunger 30 sliding in a cylindrical housing 32, which is open at the other end. Within the housing, the plunger 30 supports a number of flat blades 33 pivoted to a slotted flange 31, on the plunger 30 at uniform intervals around the axis, each blade being coplanar with the axis. The outer edge 34 of each blade terminates at the end nearest to the closed end of the housing 32 in a heel 35 and at the other end in a tip 36. The heels 35 rest against the internal surface of the housing 32, which surface slopes inwardly over its length as shown at 37.

A secondary plunger 38 slides longitudinally within the plunger 30 to extend therefrom at both ends. Fixed to the end of the plunger 38 projecting from the plunger 30 within the housing 32 is a terminal flat circular plate 40 which has radial slots around its periphery to receive the blades 33. At the other end, the plunger 38 has a knob 41 fixed to it, with a compression spring 42 retained between the inside of the knob 41 and the adjacent end of the plunger 30.

The open end of housing 32 is used to clamp against a lower clamping ring 39 having the same internal diameter as the open end of the housing 32. Clamping force is applied by a partially compressed spring 43.

In operation, a heat softened sheet 45 of polypropylene 0.8 mm thick was clamped between the ring 39. By pressing on the knob 41, the plunger 38, and through the spring 42, the plunger 30, advanced along the housing 32 until the tips 36 engaged the sheet 45, deflecting it as shown in FIG. 6. During this movement, the heels 35 of the blades 33 slide along the internal surface of the housing 32.

As the plunger continued to advance, the heels 35 were pressed inwardly by the sloping portion 37 of the internal surface of the housing 32. As a result, the blades 33 rotated about their pivots, moving the tips 36 outwardly away from one another, as shown in FIG. 7. During this movement, the portions 46 of the sheet were stretched, mainly longitudinally as well as laterally according to the position and shape of the sloping surface 37, and the portion 47 inside the array of tips 36 was stretched uniformly in all directions, i.e. biaxially oriented.

As the plungers continued to advance, the portions 46 of the sheet were still further stretched, until the rear end of the plunger 30 abutted against the housing 32, as shown in FIG. 8.

On further pressure on the knob 41, the spring 42 compressed, until the knob engaged the housing 32, at which time the plate 40 contacted the under side of the sheet portion 47, pressing out the base corner of the cup shaped forming 48.

When the sheet had cooled, the plunger 38 was retracted until the sleeve 39 contacted the plunger 30, whereupon the plungers 38 and 40 were retracted together to the position shown in FIG. 4. The housing 32 was then lifted from the sheet allowing the finished product, which was a cup as shown in FIG. 1, to be removed from the apparatus.

Figure 10:
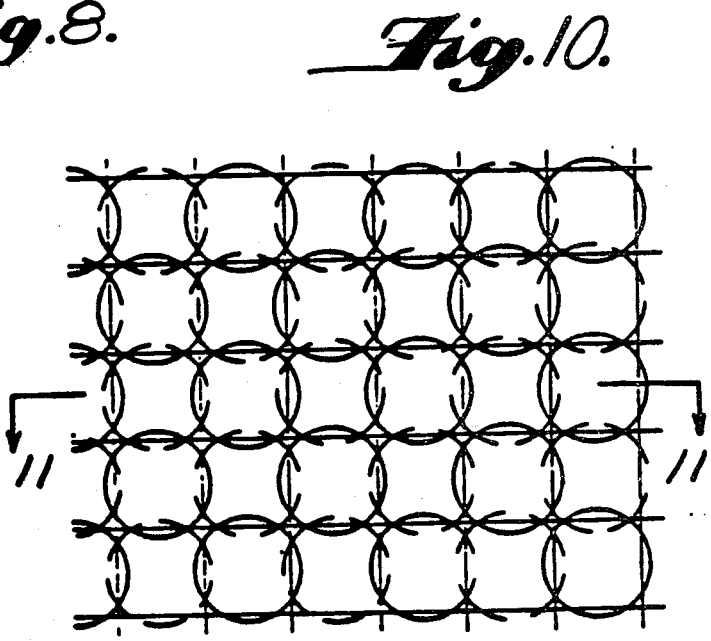
FIG. 10 is a plan view of an arrangement whereby a number of interpenetrating tools cooperate to simultaneously produce a multiplicity of cups.
Figure 11:
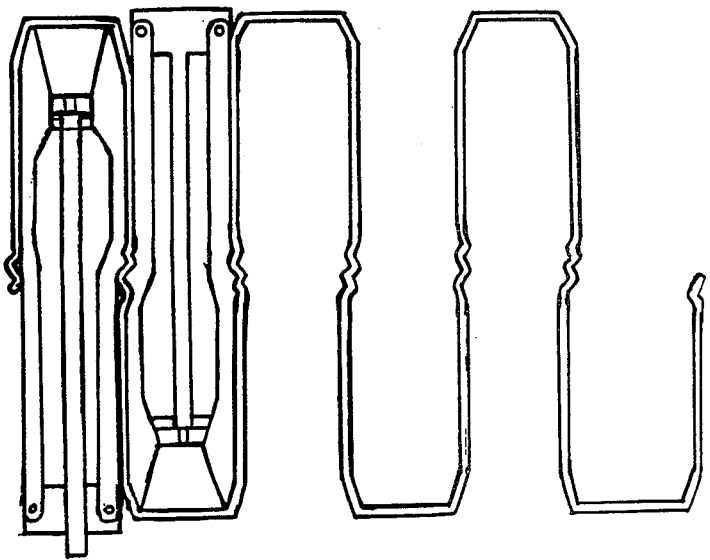
FIG. 11 is a cross-section through FIG. 10 in the direction of arrows 11—11.

As shown in FIGS. 10 and 11, it is possible to arrange a number of tools of the construction shown in FIG. 4 on opposite sides of the sheet 45 in such a way that the tools interpenetrate as they advance in unison.

The cups formed by the apparatus shown in FIG. 4 may be further dilated by blowing while still hot enough to be deformed into a female mold slightly larger than the cup, as shown in FIG. 12.

By forming external notches 48 in the blades 33, as shown in FIG. 14, it is possible to form a cup inside a female mould 49 of such shape that, on dilating the cup with compressed air, a necked jar 50 as shown in FIG. 15 is obtained.

A suitable polypropylene for making cups illustrated in the drawings has a melt flow index of 1.5 g/10 minutes and is a sequential copolymer of propylene with 13% (by weight of the copolymer) of ethylene made by injecting ethylene into the closing stages of an otherwise homopolymerisation of propylene. The sheet polypropylene is heated to a temperature of 160 degrees celsius and the tips and knife-edges of the stretching tools are heated to 100 degrees celsius.

For use in the method and apparatus of this invention, the invention also provides a stretching tool comprising outwardly separable tips.

The thickened ribs or bands 25 are deliberately formed to perform two functions, first to control the stretching during hot-forming, second to stiffen the cup. It can be shown that the structure of the wall, namely relatively thick ribs connected by thinner webs, curved or flat, gives superior stiffness to weight properties over conventional, uniform thickness container walls.

For example, a plain polystyrene cup weighing 14.95 g having a wall thickness varying between 0.5 mm and 0.3 mm was tested and found to have a crush load of 37 kg. A ribbed cup according to the present invention, weighing 14.75 g but otherwise identical and a crush load of 42 kg, i.e. 13% greater.

Relatively independent control of the forming of the webs and the chilled reinforcing ribs can be achieved by using enough knife blades so that the combined effect of the increased viscosity of the chilled material can draw out material from the parts of the material not in contact with the blades. The portion of the blades in contact with the material define the position and length of the reinforcing ribs. The path of the blades can be designed so as to give a predetermined length of contact between blades and material. This in conjunction with the time of contact and the area of chilling at the blade/material interface control the thickness of the rib. In general it is preferred to produce the thickest possible rib, and the rib to web wall thickness ratio should preferably exceed 1.5 for significant stiffening to occur.

The containers produced by the apparatus of FIG. 4 have walls which are often biaxially oriented and hence have improved hoop strength. Where it is intended to further biaxially orient the containers by inflation as shown in FIGS. 14 and 15, the ribs serve as a reservoir of amorphous material permitting elongation in both width and length yet serving to deliver the material in a controlled way.

Figure 9:
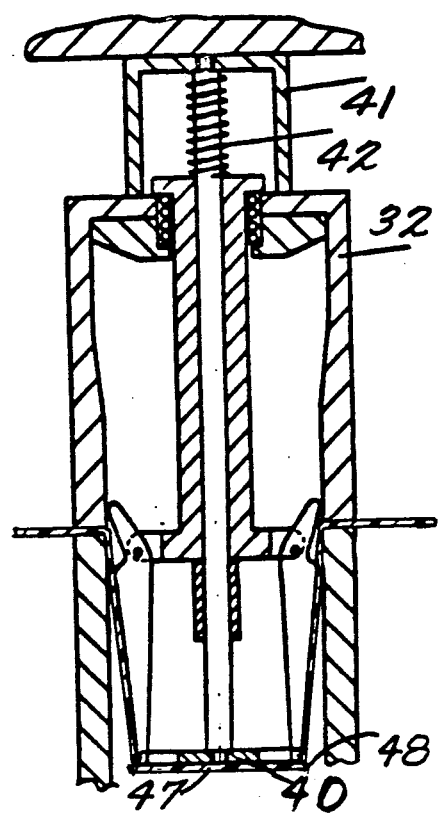

Referring now to FIG. 12, it will be seen that this view corresponds to FIG. 9 except that the support ring 39 has been modified to be in the form of a female mould 60 which cooperates with the blades 34 in the forming of the container. In addition, it is desirable that air be introduced into the container as formed by the blades 34 with the air being under pressure and sufficient further to deform the container to match the internal configuration of the mould 60. For that purpose an air line 61 is coupled to the housing 32. In view of the fact that the housing 32 will receive air under pressure, it is necessary that the plunger 38 be sealed relative to the plunger 30 and that the plunger 30, in turn, be sealed relative to the housing 32. Accordingly, the plunger 30 carries a suitable sealing ring 62 which forms a seal with the exterior of the plunger 38. The bearing 31 carries a suitable sealing ring 63 which forms a seal with the exterior of the plunger 30.

All other features of the moulding apparatus will be the same as those described with respect to FIG. 9.

FIG. 13 is also a modification of the moulding apparatus of FIGS. 6-9 and differs therefrom only in that the plate 40 is formed to have an increased thickness and is provided on the underside thereof with a central recess 64. The plate 40 cooperates with a male mould member 65 which is supported for vertical movement by a support 66 to form in the bottom of the resultant container a recessed area 67.

Reference is now made to FIG. 16 wherein it will be seen that the housing 32 is cylindrical and is free of its cam shaped interior. Instead, the plate 40 has formed on the upper surface thereof a cam ring 68 which is engageable with the inner edges of the blades 33. In addition, the inner edge of each blade 33 is provided with a cam 69 which cooperates with the cam 68 to effect the wedging or camming out of the blades 33 as the plunger 38 and the cam ring 68 move downwardly.

Although in the description of FIG. 16 it has been specifically indicated that the housing 32 will be used without the internal cam surface 37, it is pointed out here that it is feasible to utilize both cam surfaces to assure the proper sequence of pivoting of the blades 33.

Figure 17:
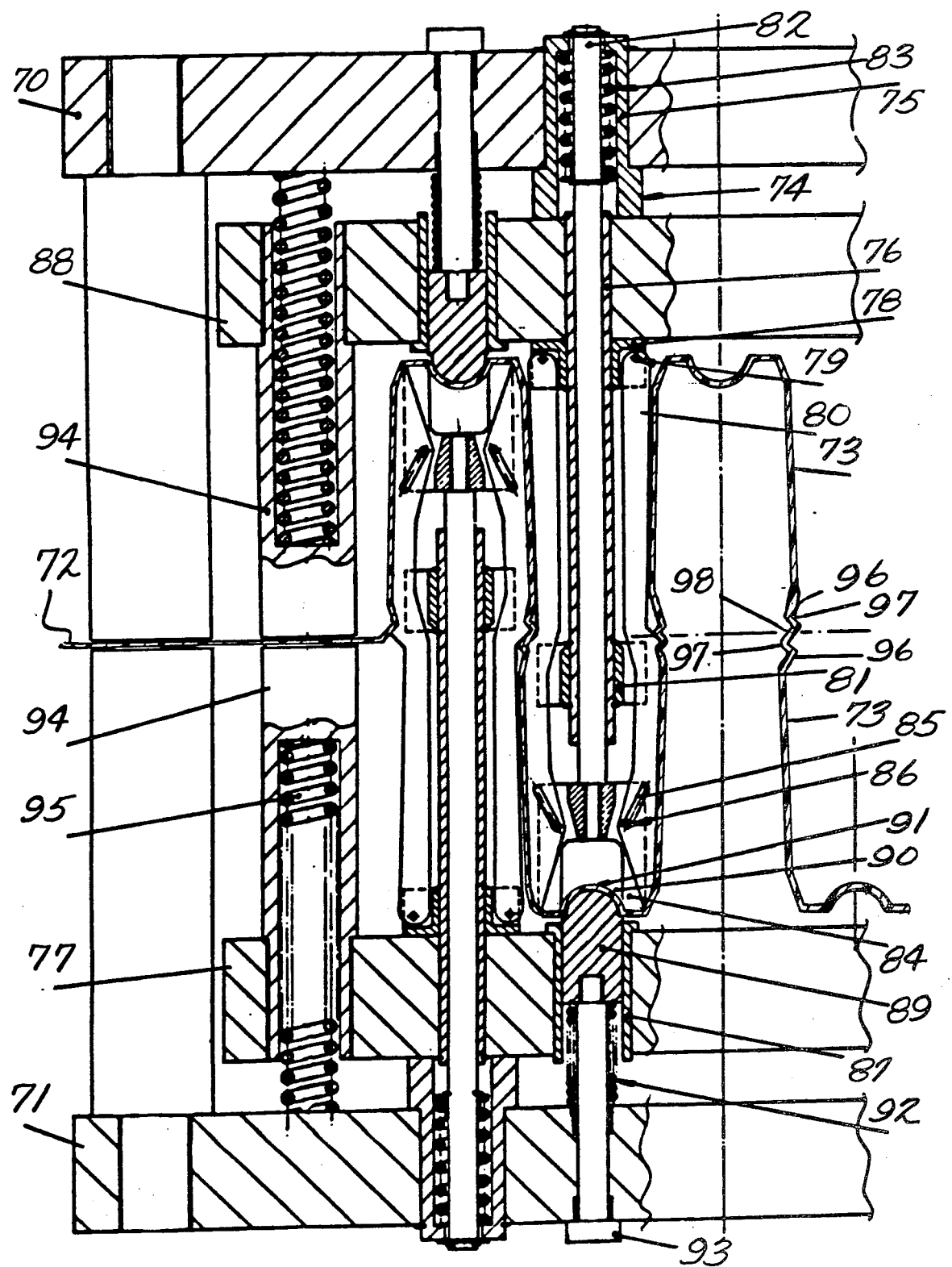
FIG. 17 is a sectional view through double acting tooling for simultaneously forming on opposite sides of the sheet cups which have diameters such that the cups overlap one another in the manner shown in FIG. 10.

In FIGS. 10 and 11 there has been illustrated an embodiment wherein containers are simultaneously formed at opposite sides of the sheet wherein the formed containers overlap one another when viewed in plan as shown in FIG. 10. Reference is now made to FIG. 17 wherein the specifics of the tooling for progressively forming such containers is best shown. The tooling includes a pair of spaced platens 70, 71 which are gradually moved together as the forming apparatus and sheet move along a straight line path. Each of the platens 70, 71 carries plural tooling which serves to form, on opposite sides of the general plane of the sheet 72, containers 73. It is to be noted that the tooling includes cooperating components carried by the two platens 70, 71.

Each fixed tooling unit, generally identified by the numeral 74, includes a support sleeve 75 carried by the respective platen. A sleeve 76 extends through and is carried by an auxiliary platen 77. In a manner to be described hereinafter, it will be seen that the secondary platen 77 is mounted for limited movement relative to its respective primary platen. The secondary platen, in turn, carries a mounting head 78 to which there is pivotally mounted by means of pivots 79 a plurality of forming blades 80, which blades are in circumferentially spaced relation.

The sleeve 76 carries at its end remote from the platen 71 a blade guide arrangement 81 which maintains the blades 80 in their respective radial planes.

A plunger 82 is journalled in the sleeve 76 for axial movement and is resiliently axially mounted within the support sleeve 75 by means of a spring 83. The upper end of the plunger 82 carries a head 84 for movement therewith and relative to the secondary platen 77 and the sleeve 76. The head 84 is of a slotted arrangement and has guided therein the remote ends of the blades 80. Each blade 80 is provided with a diagonal slot 85 which receives a pin 86 carried by the head 84 wherein relative axial movement of the head 84 relative to the blades 80 will result in the blades 80 being radially outwardly expanded.

It will be seen that each tooling set includes a guide sleeve 87 associated with the primary platen 70. A male mould member 89 is slidably mounted within the guide sleeve 87 for cooperation with a recess 90 in the end of the head 84 to form in the respective container a recessed bottom area 91.

Each male mould member 89 is urged to its operative position by a spring 92 which is compressed between the primary platen 70 and the mould member 89 and the movement of the mould member 89 through the guide sleeve 87 is limited by means of a headed retaining pin 93 which is slidably mounted in the primary platen 70.

Referring now to the left of FIG. 17, it will be seen that the secondary platens 77, 88 carry opposed tubular stop members 94 which limit the movement of the secondary platens 77, 88 together and thus the relative movement of the sets of blades 80 with respect to the general plane of the sheet 72 which is to be formed. It will also be seen that the tubular stop members 94 carry compression springs 95 which bear against the primary platens 70, 71 and normally retain the plungers 82 and the associated heads 84 in retacted relation relative to the blades 80.

It is to be understood that the plates 70, 71, 77 and 88 are preferably in the form of bars which form portions of endless conveyors with the platens 70, 71 being gradually urged together by way of cams and cam tracks (not shown) so that there is progressive forming of the sheet 72.

Reference is now made to the right side of FIG. 17 where it will be seen that each container 73 has a reduced diameter neck portion 96 and an outwardly flared flange 97 with there being between the flanges 97 a small scrap part 98. The scrap part 98 is removed leaving the flanged containers 73. It is to be understood that because of the particular relationship of the containers 73 with respect to the sheet 72, it is generally shown in FIG. 10, even the scrap portion 98 is thinned out by stretching so that the scrap may be held to a minimum and on the order of 8% to 15% by weight.

Figure 18:
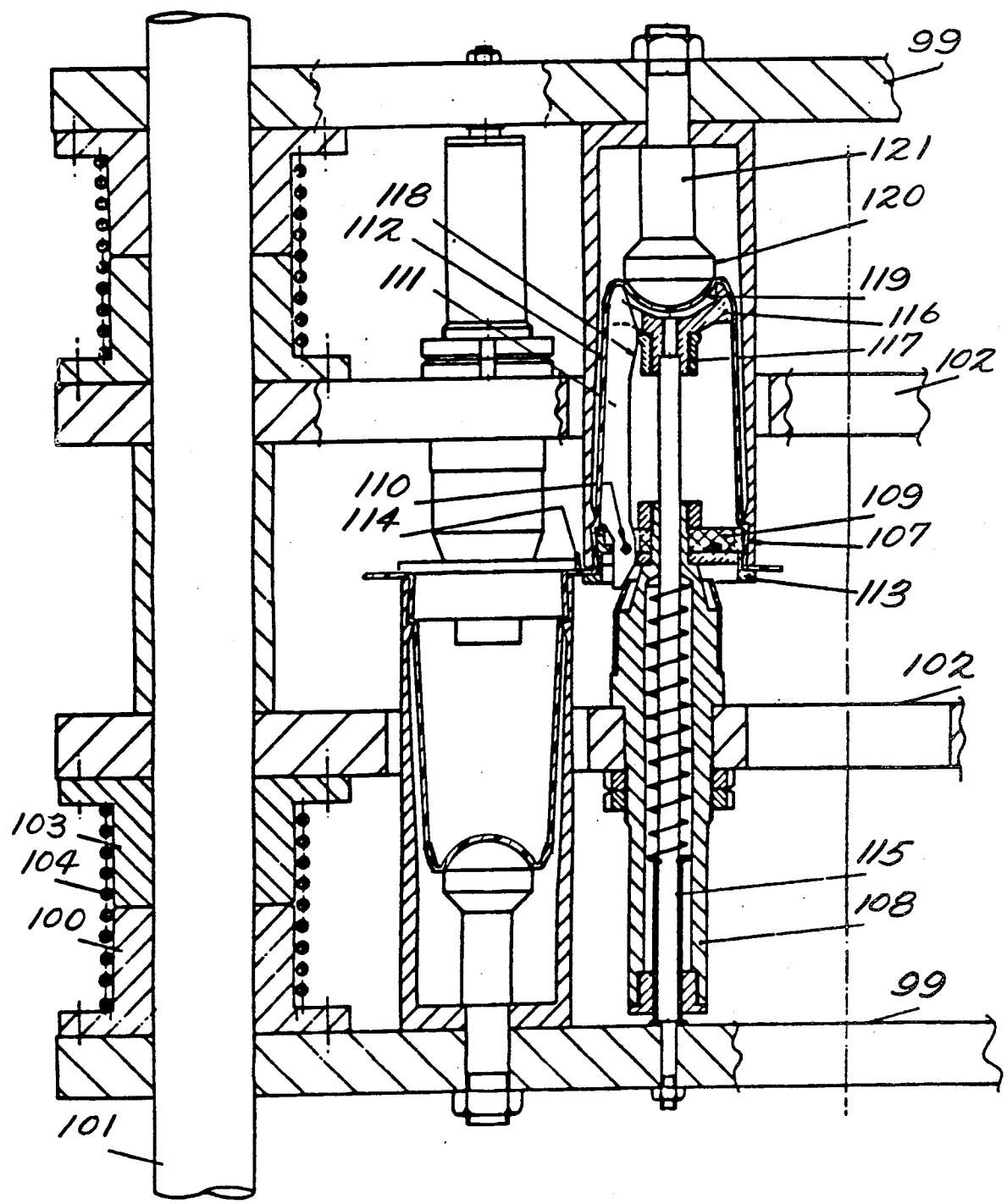
FIG. 18 is a sectional view through double acting tooling wherein cups having recessed bottoms and stacking rims may be automatically formed on opposite sides of the sheet.

Although in FIGS. 6–9, and 12–16 and 32–39 containers are formed to only one side of the sheet material, it will be readily apparent that utilizing light tooling, containers may be simultaneously formed to both sides of the sheet of the type shown in FIGS. 10, 11 and 18, but in non-overlapping relation. In FIG. 18 there is illustrated apparatus of the general type shown in FIG. 17 which includes a plurality of remote platens 99 which are parts of two endless conveyors and wherein the platens 99 are in the form of transverse bars which, when they become portions of opposed runs of the conveyor, move together. Each set of tooling includes parts carried by each of the platens 99.

Each platen 99 carries a guide sleeve 100 which has slidably mounted therein a guide pin 101 carried by an associated secondary platen 102. Each secondary platen 102 also carries a guide sleeve 103 carrying the respective pin 101 and the guide sleeves 100, 103 are abutable to limit movement of the platens 99, 102 together. The platens 99 and the secondary platens 102 may either be separately mounted for relative movement by means of cams and cam tracks (not shown), or only the platens 99 may be mounted for movement together by means of cam followers and cam tracks. In the latter event, the platens 102 would be resiliently urged away from the platens by springs 104.

Each tooling set includes a tubular housing member 105 carried by the platen 99 and is cooperable with tooling carried by the other platen 99. The housing 105 may carry a female mould 106 and in cooperation with that mould provides a step 107 which permits the neck portion of the resultant container to be of a larger diameter than the adjacent portion of the body so as to permit nesting of the containers without wedging.

The secondary platen 102 remote from the first mentioned platen 99 carries a sleeve 108 which at its inner end carries a head 109. The head 109 has pivotally mounted thereon by way of pivot pins 110 a plurality of circumferentially spaced blades 111 which are cooperable with the mould 106 to shape a sheet therein to define a container 112.

The head 109 carries a forming ring 113 which, in association with the inner part of the housing 105, forms the stepped neck portion of the container 112 together with a flange 114 which lies in the original plane of the sheet.

A plunger 115 is slidably mounted within the sleeve 108 and is carried by the remote platen 99. The plunger 115 extends through the head 109 and terminates in a head 116. The head 116 carries a cam 177 which is engageable with cam surfaces 118 on the inner surfaces of the blades 111 to expand the blades to the mould configuration after the sheet has been first drawn into the mould.

The container 112 is provided with a recessed bottom 119 which is formed by a cooperating portion of the head 116 and a male mould member 120 which is carried by a rod 121 journalled both in the mould 106 and the associated platen 99.

It will be apparent that as the platens 99 and 102 of each set progressively move together, the blades 111 will first serve to form projections on opposite sides of the sheet material and after these projections have been axially completed, they are radially expanded by the blades 111.

Figure 19:
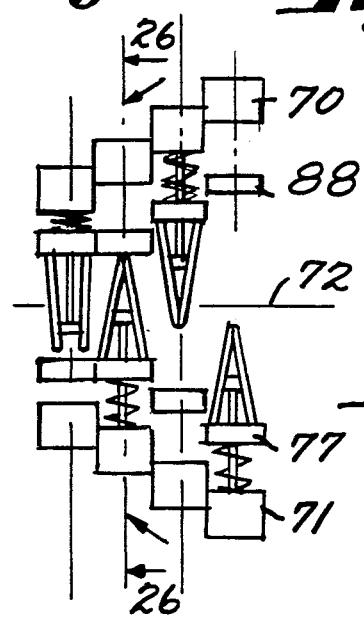
FIG. 19 is a schematic side elevational view showing the manner in which tooling may progress toward an intermediate sheet and then in overlapped relation to form cups on opposite sides of the sheet generally using the tooling of FIGS. 17 and 18.
Figure 20:
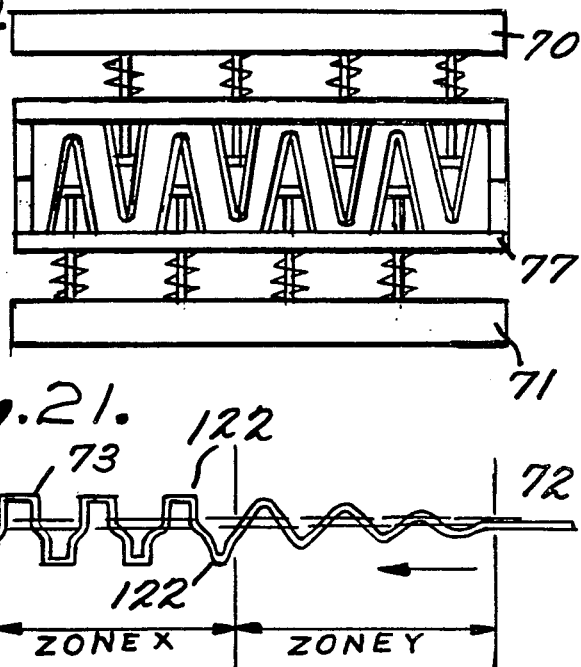
FIG. 20 is a transverse vertical sectional view taken generally along the line 26—26 of FIG. 20, and shows the relationship of adjacent tooling arranged in transverse alignment.
Figure 21:
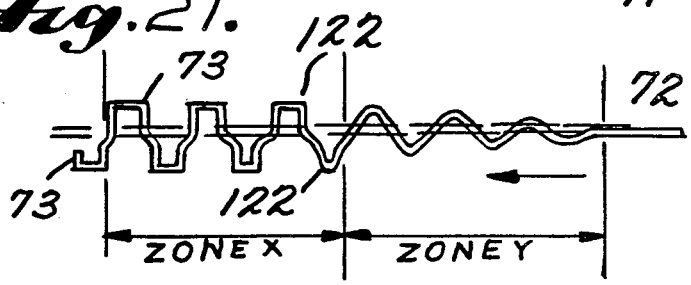
FIG. 21 is a sectional view through a sheet showing the manner in which it is progressively formed using the tooling of FIG. 17 or 18.

With respect to the mechanisms of FIGS. 17 and 18, reference is now made to the schematic showings of FIGS. 19, 20 and 21. It will be seen that, with general reference to FIG. 17 and specifically referring to FIG. 19, as the primary plates 70, 71 and the secondary platens 77, 88 move together, the tooling first engages the opposite surfaces of the sheet material in staggered relation, and then progressively effect the drawing thereof into generally cup-shaped configurations in the manner shown in FIG. 21. A typical cup-shaped configuration is identified by the numeral 122 in FIG. 21, the resultant cup-shaped configurations 122 being the result of cuspation. Thereafter, as is clearly shown at the left of FIG. 19, the tooling is dilated radially to stretch and orient the plastic sheet material to form the containers 73 which are in staggered relation on opposite sides of the sheet 72.

The inter-nesting relationship of the tooling is clearly shown in FIGS. 19 and 20 and it is to be understood that because the tooling is acting simultaneously on opposite sides of the sheet material 72 and each tooling at one side of the sheet is surrounded by four other tools, there is no need to clamp the sheet and, furthermore, the sheet material intermediate the tooling is also stretched and drawn so that the waste material which exists between adjacent containers 73 is not only small in area, but due to its reduction in thickness, is further reduced.

As already discussed, in certain forms of open necked containers, notably those in which a liquid or gas is to be retained under pressure it is desirable to stretch the material below its crystalline melting point giving uniaxial or biaxial orientation. This, in turn, gives common plastics the new properties needed to retain gas pressure over long periods, to resist expansion due to creep and to develop tensile strength combined with impact toughness. It is particularly desirable in the case of pressure containers, that hoop, or circumferential strength and creep resistance be as uniform as possible down the container wall.

If a relatively high degree of uniform hoop orientation can be imparted, this ensures that an economic container can be made which will not have areas of slow creep expansion under pressure and which will resist axial splitting under pressure or because of sudden impact such as might occur when a filled and sealed pressure container is dropped.

In stretch-blow forming of carbonated beverage bottles, an injection moulded or extruded preform is inflated at the orientation temperature. The screw neck whereby the preform is held during inflation is not itself inflated, and is therefore not oriented at all.

Figure 22:
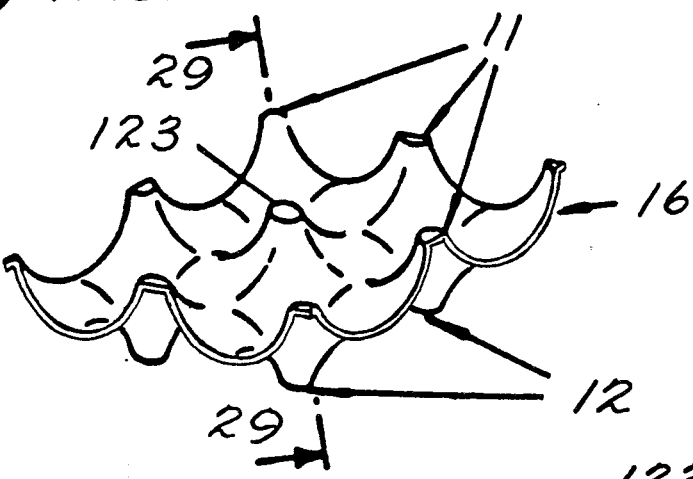
FIG. 22 is a perspective view of a sheet which is provided with a series of cusps on opposite sides of the sheet and with the cusps being in alternating relation up and down both longitudinally and transversely on the sheet.
Figure 23:
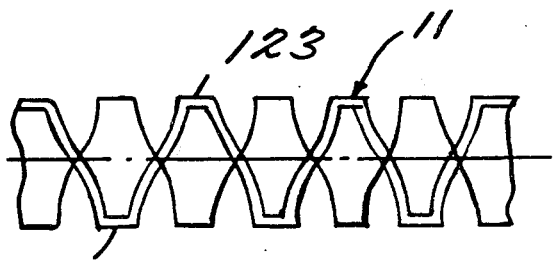
FIG. 23 is a diagonal sectional view taken generally along the line 29—29 of FIG. 20.
Figure 24:
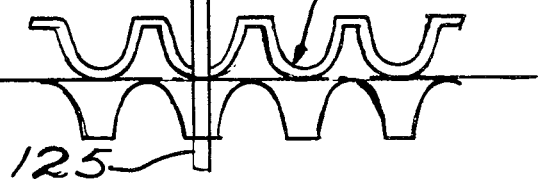
FIG. 24 is a sectional view taken longitudinally of the sheet generally in the direction of the arrows A in FIG. 20, and shows the sheet being held intermediate respective cusps.

In open necked pressure containers, such as in can shapes, it is desirable and important to fully orient the wall right up to and including the flange, which necessitates that the complete forming be expanded radially. One method for achieving this according to our invention is illustrated in FIGS. 22 to 29. In FIG. 22 a sheet has been drawn in opposite directions to opposite sides thereof to provide groups of cup-like preforms 123 which are arranged in a square array alternately opposed so that each upwardly directed preform 123 is surrounded by four downwardly directed preforms with the entire group comprising an unperforated sheet and the preforms arranged in the sheet in a standing wave pattern as is best shown in FIG. 23. The number of preforms in a single array is not critical, but it has been found useful to employ sheets containing large number of preforms, for example 100 preforms arranged in 10×10 rows. It is also to be noted that the cavities of the preforms 123 are reversed and the walls of the cavities have been formed under tension and whose tensions are confluent with opposite neighbouring cavities except at saddle points 124 (FIG. 24) which may be clamped using clamp rods 125.

Referring now to FIG. 25, it will be seen that the preforms 123 may initially be shallowly drawn and while disposed in adjacent relation the spacing between centers of the preforms may be varied by moving adjacent preforms in both longitudinal and transverse directions as indicated by the arrows 126 and 127, respectively.

Referring now to FIG. 26, it will be seen that relatively shallow and relatively close together preforms 123 may be stretched and enlarged by both moving the centers apart longitudinally and transversely and by increasing the depth of the draw so as to define deeper and more widely spaced preforms 128 which, of course, have thinner walls.

The sheet having formed therein the preforms 128 may then be transferred to another set of tooling shown in FIG. 27 and the spacing between this next set of tooling is then increased both longitudinally and transversely and the depth of the preforms may be increased to define a new set of preforms 129 as shown to the right in FIG. 27.

The preforms 129 are now ready for dilation and radial stretching and orientation. The preforms 129 are now presented to dilating tooling in FIG. 28 and each preform 129 is drawn into a generally cylindrical configuration to define preforms 130. These preforms 130 preferably have a depth of the order of twice the desired cup-shaped member and, as is shown in FIG. 29, the sheet may be divided by removing the central portion thereof into a plurality of shallower preforms or cup-like containers 131 as shown in FIG. 29.

The mechanisms for changing the center-to-center dimensions of the preforms are not narrowly critical and may include crossed multiple lead feed screws, acting in two axes simultaneously utilized for this purpose.

It is to be understood that the force requirements of a machine utilizing the tooling of FIGS. 26 to 29 is usually below 500 kg per preform cup wherein the tooling provides a stretch not to exceed two axially and three hoop for a six-fold increase in area.

Operation on a sheet of preforms comprises a single press stroke which may exert extensions at rates as high as 100% linear per second, although somewhat slower strain rates enhance the development of crystallinity.

The operation of one stretching stroke prepares the preforms to fit the larger tools of the next press and so on. Up to four pressings may be used to obtain extreme orientation such as hoop 5, axial 2.5=12.5 fold area gain. It is preferred that every forming stage but the last (FIG. 29) leave a preform with a sloping wall. The last stage may produce vertical walls or even reverse taper walls and does not exclude finishing by blow moulding into a mould.

It is to be understood that all of these operations must take place within a restricted biaxial orientation temperature range and the entire tooling is preferably located within a tunnel oven through which the preform sheets are passed from tooling to tooling.

With respect to the utilization of preforms in blow moulding processes, reference is now made to FIG. 30 wherein a non-circular cross sectional and non-linear straight line container is to be formed. A desired preform 137 may either be directly formed from the sheet material 138 in a single operation into the mould 139, or by a plurality of operations as is shown both in FIGS. 26–29. In this case the preform is then placed in a mould 139 of the desired configuration and either before or while within the mould the thick top 140 of the preform is axially stretched by means of a stretch rod 141.

The blow moulding preform as shown, whether formed in one step or many, is finally shaped to generally match the mould configuration as closely as possible utilizing a plurality of blades 142 in the manner previously described, with the blades being progressively opened as axial stretching takes place by way of a control cam 143. The preform 137 is now ready for blow moulding and the thick top 140 provides adequate material for blowing into a screw threaded neck shape.

It is to be understood that when the preform 137 is to be blow moulded in place, it is necessary that a housing 144 which carries the cam 143 be sealed and that there be provided means for introducing blowing gas under pressure within the housing 144.

With reference to FIG. 31, it will be seen that when the bottle to be moulded is of elliptical configuration the blades 142 will also assume an elliptical configuration.

Certain plastics suitable for orientation forming have quite high stretching stresses at orientation temperature. Polyethylene terepthalate, for example, has a stretching stress of around 1.5 to 2.0 kilograms per square millimeter at 100 degrees celsius.

Such stresses are difficult to achieve using mechanical tools such as shown in FIGS. 12 and 26 to 29 without some assistance from air pressure applied during the dilation step. Furthermore tool arrangements such as shown in FIG. 12 would not allow uniform circumferential orientation to be imparted as the blades do not dilate at the rims of the forming, only at the base.

Reference is thus now made to FIGS. 32 to 35 wherein a form of tool is shown which will enable circumferential orientation of an open mouthed container shape to be attained. Typically the axial orientation ratio is 1.5 to 2.0 and the circumferential orientation ratio is 3 giving and overall stretch of 4.5 to 6.

In this tool a cluster of pivoting blades 190 are entered into the sheet material in the closed position by pushing on pin 191 via flange 195.

The force of pushing is transmitted from the pin 191, through two pre-compressed coil springs 193 and 194 to flange 196 which pushes blades 190 via pivot points 197. The initial pushing step stretches the sheet until the top surface of housing 198 meets the under side of housing 199 clamping the sheet and sealing it so that air pressure may be applied to the formed sheet via spigots 200 or 201.

FIG. 33 shows the material in the pre-stretched clamped position after the first primary movement of clamp 195 is completed.

FIG. 34 shows the next sequence in forming wherein air pressure applied through spigot 200 forces the formed material against the closed blade cluster where it is held for a period of time until the temperature of the so formed tube shape 202 lowers to the orientation temperature. The air pressure exerted via spigot 200 is then removed and a second push on flange 195 first pushes the closed blade cluster 190 further into housing 199 until the spring 194 is fully closed, then begins to move pin 191 relative to flange 196, exerting an outward opening pressure on the blades 190. Simultaneously air pressure is introduced via spigot 201 which helps to expand the formed tube 202 against the internal surface of the housing 199.

The blades 190 thus only touch the completed forming at the base whereas air pressure completes most of the inflation of the final shape.

If an inflation pressure is used which is sufficient to inflate the main walls of the container, but which is insufficient to completely shape the base, then unique base shapes result as in FIG. 35b, wherein ribs 203 connect material tension in the base to tension in the wall via indented saddles 204 so that the ribs 203 stand in relief to form a stable base while the saddle tension forms 204, are maintained between the base and walls.

Such a form is well suited to resist the creep and inflation forces on the base and wall which develop when the shape is pressurized.

Reference is now made to FIGS. 36–40 wherein an apparatus similar to that of FIG. 12 is illustrated and shows the manner in which a necked-in container may be formed on a continuous basis from a continuous sheet or web 145. It will be seen that a mould 146 which is formed in two halves 147, 148 may be carried by two carriages 149, 150, respectively. The mould 146 is of the type to form a necked-in flanged container 151 as is best shown in FIG. 40.

It is to be understood that the forming of the plastic sheet material within the mould 146 may be assisted by a vacuum line 152 which is connected to vent passages 153 in the base of the mould 146.

For each mould there is a combined housing, clamp and possibly cam member 154 which may correspond to the housing 32 of FIG. 20. The member 154 cooperates with the top of the mould 146 to clamp a selected portion of the web or sheet 145 for forming.

With reference to FIG. 37, it will be seen that a plurality of blades 155 are pivotally carried by a head 156 which, in turn, is carried by a plunger 157. Normally the blades are retracted, as is best shown in FIG. 40. It is to be understood that the blades 155 may be expanded in timed relation to their movement within the mould 146 by means of a cam surface formed on the member 154 in the manner shown in FIG. 20, or by means of a cam, such as the cam 68, carried by a separate plunger. The manner in which the blades 155 are expanded and retracted is immaterial.

It is to be understood that there will be a plurality of pairs of carriages which will extend transversely of the machine and which will be parts of an endless conveyor, and that each pair of carriages will carry a plurality of moulds 146 which are transversely spaced. It is also to be understood that there will be a progressive movement of the housing member 154 and the blades 155 first toward the sheet 145 and then into the mould 146 so that the forming of the containers 151 will be a continuous, progressive operation.

It is also to be understood that while in FIGS. 36–40 the containers have been illustrated as being formed to one side only of the sheet 145, they may be formed simultaneously to opposite sides of the sheet in the general manner hereinabove disclosed.

With reference to FIG. 36, the sheet 145 has been clamped against the upper surface of the mould 146 by the member 154 and the blades 155 have moved downwardly and are initially drawing the clamped portion of the sheet into the mould, producing an axial stretching of the sheet.

In FIG. 37 the drawing action has been completed and the blades 155 have been radially expanded to stretch the sheet circumferentially. At the same time, vacuum has been applied to draw the partially formed sheet onto the mould wall. With respect to this point, although the vent passages 153 have been illustrated only as being formed in the mould bottom, similar vent passages may also be formed in the mould cylindrical wall.

Referring now to FIG. 38, it will be seen that the blades 155 have been withdrawn and the moulds and toolings of this particular portion of the machine are now approaching the righthand end of the machine where the blades 155 will move upwardly and to the right, and the moulds 146 will move downwardly and to the left.

Referring now to FIG. 39, it will be seen that the mounting of the carriages 149, 150 is such that the carriages move independently of one another and as the front carriage 150 moves around an arc in a clockwise direction, it moves away from the rear carriage 149 thereby separating the mould halves 147, 146. The formed container 151, while still being a part of the sheet 145, may now be removed from the open mould by moving the sheet 145 upwardly and to the right in a counterclockwise direction with a similar movement having been imparted to the blades 155. Thus removal of the moulded container 151 is automatic.

Referring now to FIG. 40, it will be seen that the individual container 151 is blanked from the sheet 145 and that a closure receiving flange 158 is automatically formed on the container 151 for receiving a suitable closure, for example, secured in place by a conventional seaming operation.

Having specifically described range and types of tooling utilized in accordance with this invention, it is now deemed advisable to discuss the function of the tooling and the advantages thereof over the prior art.

Figure 41:
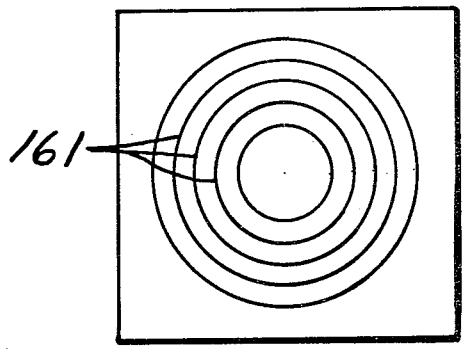
FIG. 41 shows a sheet clamped within a clamp having a circular opening and with the sheet having rings thereon.
Figure 42:
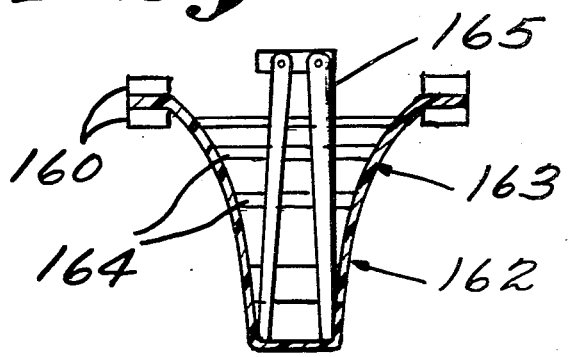
FIG. 42 is a generally sectional view through the assembly of FIG. 41 in its partially stretched condition.
Figure 44A:
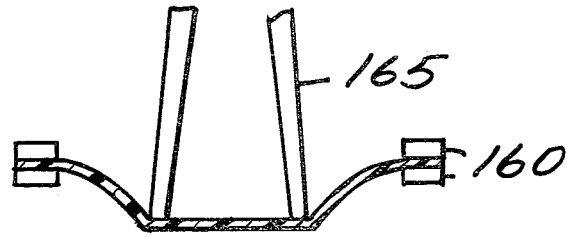
FIGS. 44a, 44b and 44c are schematic sectional views showing the manner in which clamped sheet material may be progressively drawn without expansion of the tool and showing specifically how the sheet material thins out more at the base of the resultant cusp than in the clamped area.
Figure 44B:
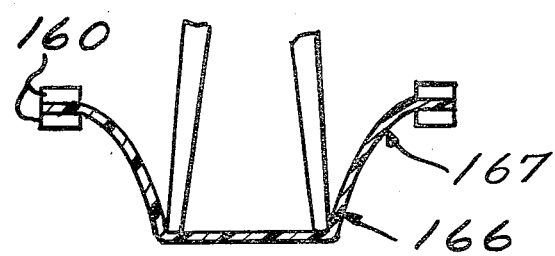
Figure 44C:
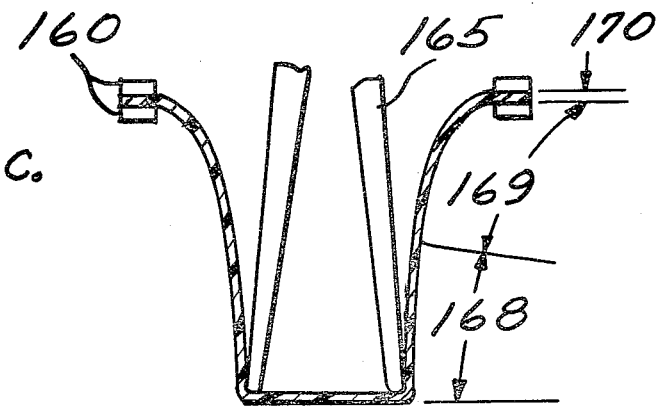

It is a mathematically provable fact that when a clamped elastic membrane is drawn down by a free stretch tool into a free tension shape, then the wall thickness is reduced progressively toward the direction of draw. This is illustrated in FIGS. 41 and 42, wherein a sheet of thermoplastic material is held by clamps 160. It is observed during draw without expansion, that a series of circles 161 drawn on the material do not change in apparent size or thickness if viewed from above (FIG. 41).

When viewed from the side (FIG. 42), the wall thickness 162 is reduced down the "cusp" shaped surface 163 in inverse proportion to the extended width of the bands 164. No extension of any part of the membrane occurs radially.

It should be noted that almost all thermoplastic materials have elasticity to a greater or lesser degree in the melt state. If draw is completed while all of the membrane remains in the melt, thinning out of the lower wall will thus occur as illustrated.

Figure 43:
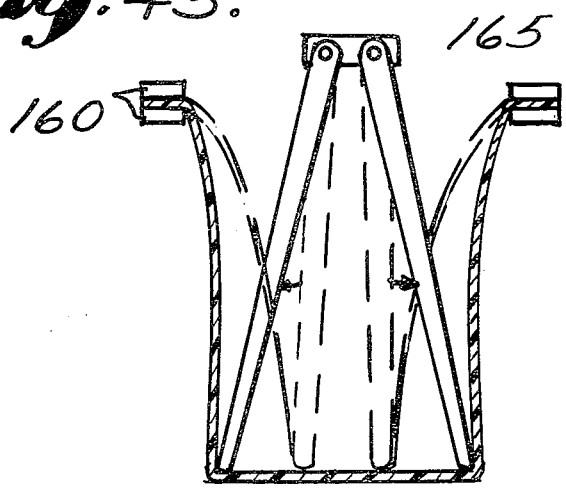
FIG. 43 is an enlarged sectional view showing the manner in which the draw tooling is expanded so as radially to stretch and orient the plastic sheet material into a generally cup-shaped configuration.

If a free stretch tool 165 is then used to dilate the cusp shape as in FIG. 43, further thinning out of the lower wall occurs, due to the increased circumference to which the material is taken, progressively down the cup wall.

Vertical crush strength is often used as the main failure criterion for non-pressure container performance in practice, due to loads imposed for filled and stacked containers when transported.

Free stretch tools in which expansion follows insertion, as in U.K. Pat. No. 860,810 (1959) and French Pat. No. 1,238,800 (1959), all suffer from the critical defect that they produce containers which always fail in crush in the lower wall.

It is thus clear that there is more plastic material in the wall, than would be needed if the wall thickness distribution was such that the cup crushed equally in all parts of the wall, when subjected to a vertical crush test.

It is possible to mitigate wall thinning in using a free stretch tool, by progressing slowly enough to enable differential cooling of the material to cause preferential stiffening of the already stretched part of the cup.

This is illustrated in FIGS. 42a, 42b and 42c, wherein stretch is shown being initiated and proceeds slowly.

The thinner stretched part 166 near to the tips of the tool 165 cools more quickly than the thicker material 167. This thin cooler area becomes stronger and tends to transfer stretch back towards the hotter clamped area. As primary draw is completed the lower wall area 168 is frozen, the upper wall area 169 is warmer and less stiff, hence is stretched out of this area preferentially.

The full thickness material 170, beyond the clamp is still fully molten.

Tools which require time dependent draw of between 5 and 10 seconds cannot be used with existing press type machinery, which operates intermittently with fast cycles to achieve reasonable productivity. Furthermore, where the expanding free-stretch tools are to be used for forming preforms only, the parison must be delivered into the mould hot and fully mouldable, if final shaping is to be able to be achieved.

For all of the above reasons it is clear that the free stretch methods and apparati used in U.K. Pat. No. 860,810 and French Pat. No. 1,238,800 did not prove viable in making commercial containers for general usage.

U.S. Pat. No. 2,974,366 (1957) discusses tools for forming of shallow draw rectangular containers. This patent mentions simultaneous insertion and expansion of the tool, but does not teach any specific reason for a relationship between insertion and expansion. Indeed, for shallow draw work, final thickness distribution is not sensitive to a relationship between insertion and expansion.

The free stretch tool as described by U.S. Pat. No. 2,985,915, describes a tool which expands in the length direction, rather than in the radial direction.

This patent teaches that a cool tool which touches the hot sheet with line contact only, will chill material at the contact line and enable drawing out of the free material between the contact lines. The resulting container will then be characterized by thick lines separated by areas of thin, free drawn material. This patent does not teach variation of wall thickness in the circumferential direction, however.

Figure 45A:
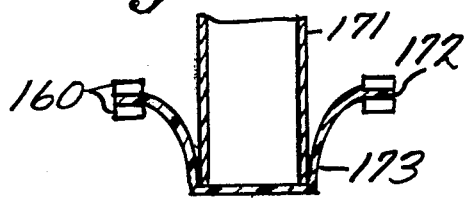
FIGS. 45a, 45b & 45c are schematic sectional views similar to FIGS. 44a–c, and show prior art arrangements.
Figure 45B:
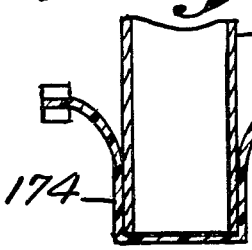
Figure 45C:
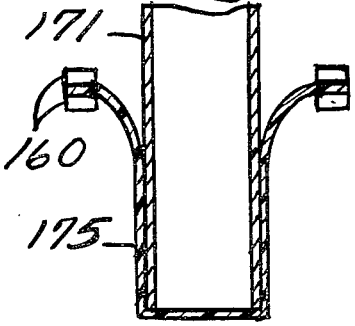

In French Pat. No. 1,214,895 (1958) solid, cool cylindrical tools 171, as shown in FIGS. 45a, 45b and 45c, are contacted by the molten sheet membrane 172 due to the inwards elastic tension curve 173 of the membrane. This chills and material as it touches the tool progressively during draw 174 and 175.

Hence, the material in contact with the tool does not stretch as much as the material available for free draw. If draw rate and tool temperature are carefully balanced, it is theoretically possible to achieve control of wall thickness.

Two major disadvantages of this art are inability to use the forming as a parison for blowing-off into a mould, and the very close control of draw rate and tool temperature required to achieve a uniform wall thickness, in practice.

For these above reasons, this patent has not come into commercial use.

U.S. Pat. No. 3,901,640 and U.S. Pat. No. 3,975,493 (1973) teach use of an expanding tool with many blades, which progressively contact the sheet. Striation or marking of the cup is prevented by means of a rubber sleeve fitted over the blades.

This tool suffers from a degree of sensitivity to temperature as discussed above, but reduces this somewhat by encouraging friction between the web and the rubber sheet, as a means to controlling thinning down of the lower wall of the container during insertion and expansion of the tool.

Expansion occurs after insertion has been completed to at least three quarters of the maximum depth of the final parison.

The tool maintains free draw in the upper wall of the web, and to remove the tension neck-in, the forming must be blown against a die wall. Hence this technique seems to be applicable only to forming of parison preforms, not to forming of finished articles in themselves.

The patent also claims that if a large number of blades are used, 200 to 300, then the rubber sleeve can be removed. Our experience has shown this to be impossible. Even if some spaces was still left between the blades when the plug was closed, the total area of untouched sheet left for free draw would be very small in relation to that which would be chilled by contact with the blades. The blades would have to be colder than the sheet, if even draw of the wall was to be achieved without the friction of the rubber liner, and even a little expansion of the plug will cause splitting of the cup wall, or at the very least will cause very thin areas to appear between the blades as their spacing was increased with respect to each other.

This patent does not therefore teach forming of longitudinal thicker ribs by line contact with blades separated by areas of free draw.

It has now been found possible to use line or limited surface contact tools to achieve programmed distribution of material thickness in the wall of a container or bottle according to the following method.

Figure 46A:
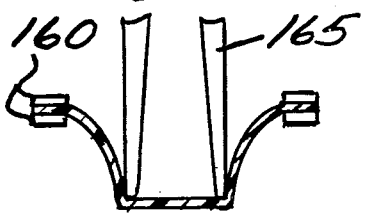
FIGS. 46a, 46b and 46c are also schematic sectional views, and show the manner in which a sheet may be progressively axially stretched and circumferentially stretched to form a cylindrical on tapered body.
Figure 46B:
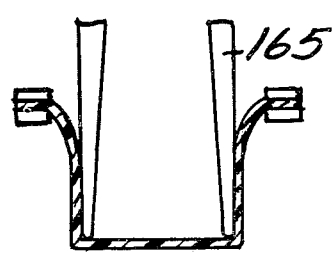
Figure 46C:
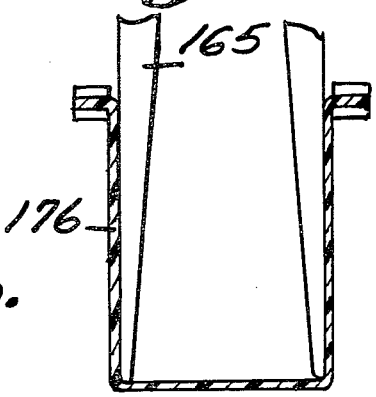

In FIGS. 46a, 46b and 46c, a free stretch tool 165 is shown (FIG. 46a) with contact edges initially closed, and beginning to stretch the sheet. As draw proceeds the edges are expanded outwards (FIG. 46b) in a controlled relationship to draw. On completion of expansion the draw (FIG. 46c) the edges define the final shape of the container 176. No female mould is required to complete the shape of the forming.

If expansion of the tool is carried out in a specific relationship with insertion of the tool it is found that the particular locus of the path of the contact blades will cause a unique distribution of cup wall thickness which is:

independent of material type;
relatively insensitive to contact edge temperature;
dependent on rate of draw;
dependent on thickness and number of contact edges.

The actual operation of such tools depends on achieving a balance between the variables which control the ability to draw material down the cup wall.

Expanding tools which contact the melt over a substantial part of the area during draw (more than 20% of the area), work either by preferential chilling, by friction or by a combination of these two.

Such tools are almost always too severe on draw down of the melt to be opened during the primary stroke, as this would result in a cup with lower wall too thick. Also such tools are subject to uncontrolled variability in operation due to temperature variations and/or variations in the coefficient of friction between the tool and the web. Consequently product quality is inconsistent.

Expanding tools which contact the melt at points or tips, only can be inserted slowly, if stretch control is to occur.

We have found that superior, more consistent control of stretch can be gained if expanding male tools, with the following permutations and combinations of features, are used:

tools which touch the sheet during forming, over less than 15% of its developed area, at any particular time during the forming episode.
tools which are cooler than the sheet melt, by at least 20 degrees celsius.
tools which use edges to help define the final wall or base shape of the article, with or without use of a cavity mould to complete the forming.
tools which are expanded whilst being inserted according to certain relationships defined in the following discussion.
tools which stretch the melt slowly, in from 2 to 5 seconds.

Use of various combinations of the above features have been used in a range of tools, many of which have been described herein. In general, it is sought to manipulate the respective contributions to stretch control from:
friction
chilling of the sheet
time rate of draw.

Figure 47A:
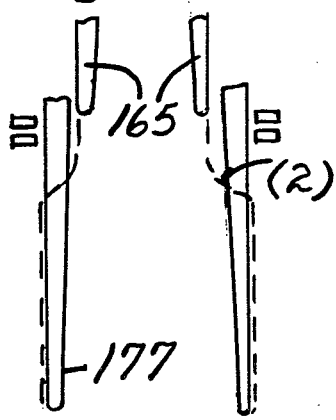
FIGS. 47a, 47b and 47c are schematic views showing the timing of tooling with respect to drawing and radial stretching.
Figure 47B:
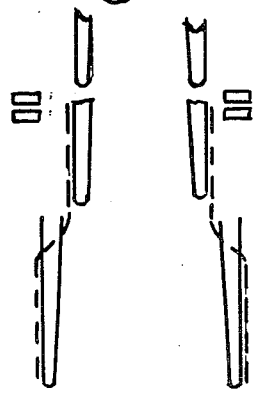
Figure 47C:
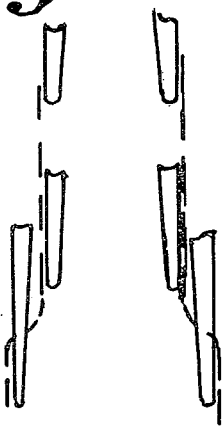
Figure 48A:
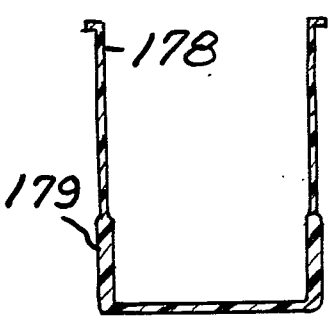
FIGS. 48a, 48b and 48c show containers with walls thickened in different portions in accordance with the timing of the expansion of the tooling in FIGS. 47a, 47b and 47c, respectively.
Figure 48B:
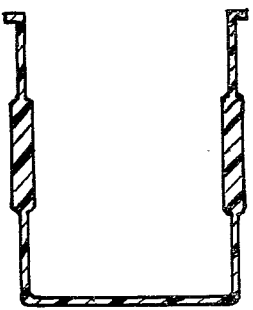
Figure 48C:
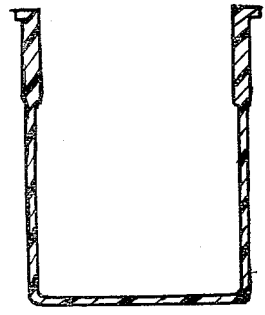

Opening of the tool in a controlled way allows these friction and chilling effects to be modified during the draw as desired. This allows any thickness distribution desired to be attained. A typical example of this is further illustrated in FIGS. 47a, 47b and 47c and corresponding FIGS. 48a, 48b and 48c, which shows a bladed expanding tool 165 which has about 15 blades, each 1 mm thick for a cup diameter of around three inches. Three relationships of tool expansion to primary draw are shown. An early expansion (FIG. 47c) gives loci of blade tips 177 as shown. This causes a cup to be formed with thin upper wall 178 and thick lower wall 179. A middle expansion tool (FIG. 47b) forms a cup with thickening in the centre wall, as shown in FIG. 48b. A late expansion tool forms a cup with a thick upper wall and a thin lower wall (FIG. 48c).

Figure 49:
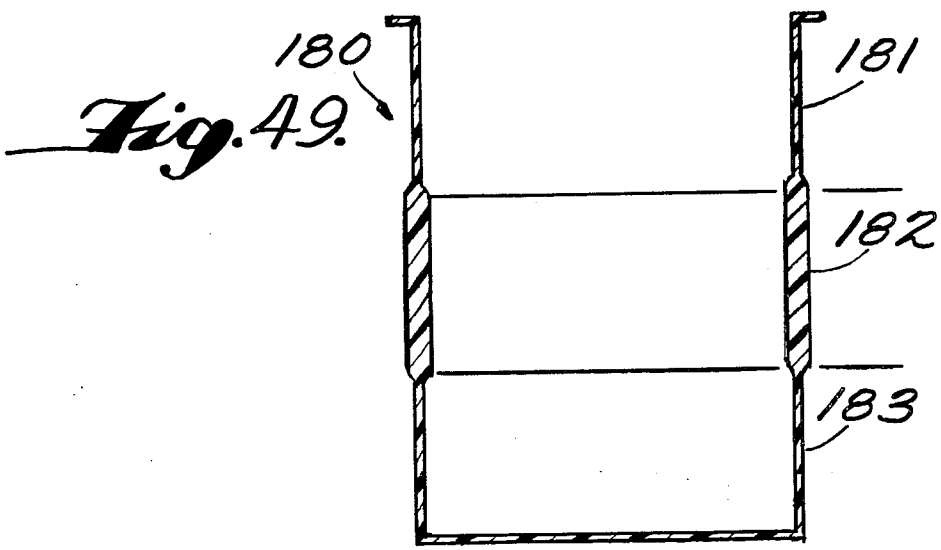
FIG. 49 is a sectional view on an enlarged scale through the cup formed in accordance with FIGS. 47b and 48b.

The unique ability of these bladed tools to closely program and control material thickness distribution in a container wall can lead to a number of important commercial benefits. In the case of drinking cups, for example, FIG. 49 shows a cup 180 with thin upper wall 181, thick middle region 182 for holding the cup and thin lower wall 183. This provides a thick, reinforced region where the cup has to be gripped, without having wasted material elsewhere.

Figures 50A, 50B, 50C:
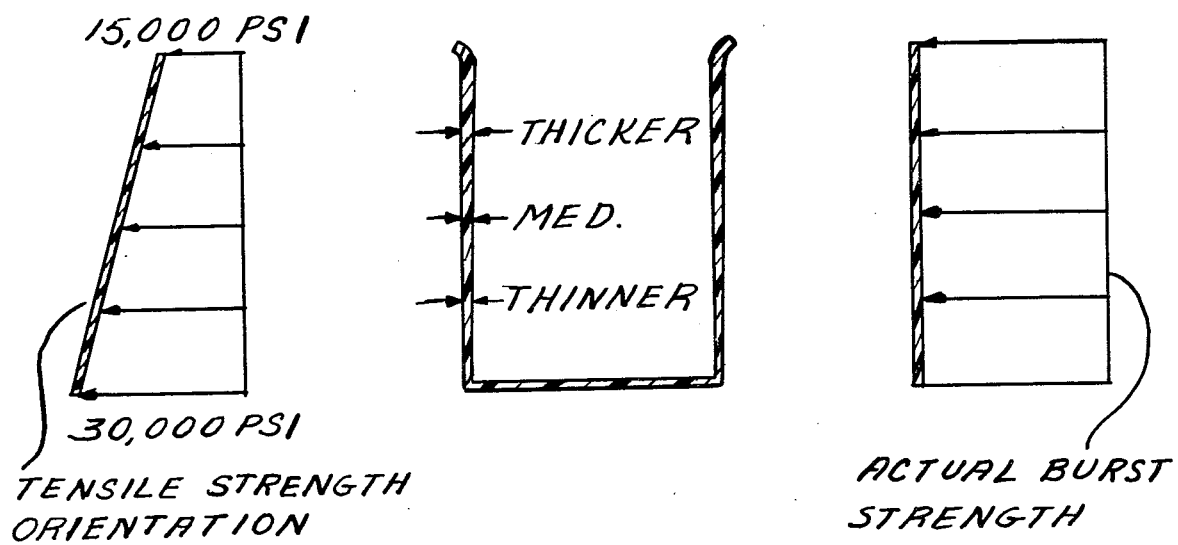
FIGS. 50a, 50b and 50c are schematic views correlating radial orientation with drawn wall thickness and burst strength.

In oriented carbonated beverage containers made from material such as PVC, PET, SAN, FIGS. 50a, 50b and 50c, shows how, using a simple tool, hoop orientation would increase progressively down the wall (FIGS. 50a) to the base. The maximum tensile strength also increases in proportion, hence it is desirable to evenly reduce the wall thickness (FIG. 50b) as the tensile strength of the material increases, so that burst strength is equalized.

Figure 51:
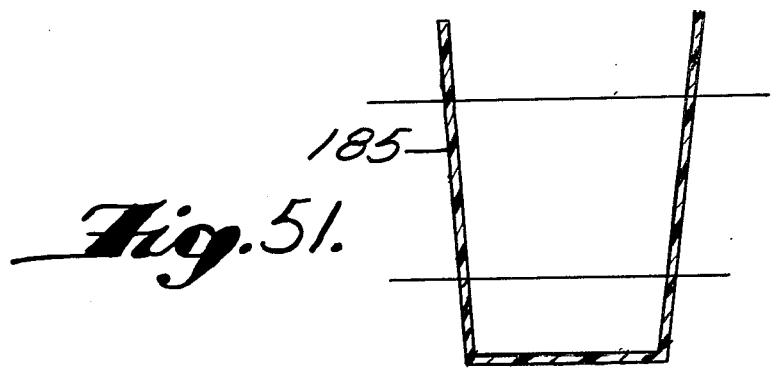
FIG. 51 is a sectional view through a container wherein there is illustrated the relationship of diameter and thickness of the container wall.

In tapered wall containers 184 as shown in FIG. 51, optimum vertical crush strength is gained when the cross sectional area of material in the container wall is held constant. Thus using the fine control of stretch achievable with our invention, the wall thickness 185 is increased uniformly down the cup wall, in inverse proportion to the tube diameter, according to the equation $\pi d_1 t_1 = \pi d_2 t_2$.

A further example of where fine control of wall thickness is required, is in forming a bottle parison wherein it is desirable to produce a tube with variations in wall thickness which correspond to the amount of later stretch required when the bottle is blown to its final shape.

We claim:

1. Apparatus for stretch-forming a heat-softened sheet of thermoplastics material, said apparatus comprising holding means to hold the sheet against substantial non-stretching movement, a stretching tool, and means to cause a primary movement of said stretching tool in a preselected direction relative to said holding means so as to cause the tool to press against a sheet held by said holding means and to stretch the sheet; characterized in that said stretching tool comprises a plurality of blades having edges for pressing against a sheet to stretch the sheet preferentially outside an area already in contact with said blade edges and there is a cam operative on the continued movement of said stretching tool in said preselected direction to move said blades transversely of said preselected direction and away from each other to simultaneously further stretch said sheet in said preselected direction and in a direction transverse to said preselected direction, said cam having a cam surface engaging a cam follower surface on each blade and said cam being a barrel cam generally telescoped over the tool and engageable with the holding means to assume an axially fixed position, and said means for causing a primary movement of said tool being operative to effect movement of said blades through said cam.

* * * * *